(12) United States Patent
Beale et al.

(10) Patent No.: US 12,712,629 B2
(45) Date of Patent: Aug. 18, 2026

(54) METHODS, COMMUNICATIONS DEVICE AND NON-TERRESTRIAL NETWORK INFRASTRUCTURE EQUIPMENT

(71) Applicant: Sony Group Corporation, Tokyo (JP)

(72) Inventors: Martin Warwick Beale, Basingstoke (GB); Shin Horng Wong, Basingstoke (GB); Basuki Priyanto, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 273 days.

(21) Appl. No.: 18/282,997

(22) PCT Filed: Mar. 29, 2022

(86) PCT No.: PCT/EP2022/058339
§ 371 (c)(1),
(2) Date: Sep. 20, 2023

(87) PCT Pub. No.: WO2022/207675
PCT Pub. Date: Oct. 6, 2022

(65) Prior Publication Data

US 2024/0171266 A1 May 23, 2024

(30) Foreign Application Priority Data

Mar. 31, 2021 (EP) .................................... 21166485

(51) Int. Cl.
*H04B 7/185* (2006.01)

(52) U.S. Cl.
CPC ................................ *H04B 7/18519* (2013.01)

(58) Field of Classification Search
CPC ........................ H04B 7/18519; H04B 7/18536
(Continued)

(56) References Cited

U.S. PATENT DOCUMENTS 7,298,327 B2 * 11/2007 Dupray ................. G01S 5/0278 342/451
9,237,543 B2 * 1/2016 Karr ........................ G01S 1/026
(Continued)

FOREIGN PATENT DOCUMENTS

EP 3111510 B1 * 8/2020 ........... H04B 17/318
WO WO-2020075044 A1 * 4/2020 ......... H04B 7/18519
WO WO-2021221736 A2 * 11/2021 ............ H04W 28/24

OTHER PUBLICATIONS

Susana Hornillo-Mellado et al, Prediction of Satellite Shadowing in Smart Cities with Application to IoT, Published: Jan. 14, 2020 , All pages and figures, (2020).*
(Continued)

*Primary Examiner* — Mahendra R Patel
(74) *Attorney, Agent, or Firm* — XSENSUS LLP

(57) ABSTRACT

There is provided a method of operating a communications device to transmit or to receive via a non-terrestrial network, NTN, infrastructure equipment. The method comprises detecting, by transceiver circuitry of the communications device, signals from the non-terrestrial infrastructure equipment during one of a plurality of in-coverage periods during which the communications device is in a coverage area of the NTN infrastructure equipment because the communications device can receive signals from the NTN infrastructure equipment carried by an aerial vehicle or relayed from the aerial vehicle as the aerial vehicle passes over the communications device.

20 Claims, 16 Drawing Sheets

(58) Field of Classification Search
USPC .......................................................... 455/427
See application file for complete search history.

(56) References Cited

U.S. PATENT DOCUMENTS

| | | | | |
|---|---|---|---|---|
| 11,621,768 | B2 * | 4/2023 | Ma ..................... | H04B 7/18526 370/316 |
| 11,696,106 | B2 * | 7/2023 | Edge ................. | H04W 56/0045 455/404.1 |
| 12,133,189 | B2 * | 10/2024 | Hajir ................... | H04W 56/006 |
| 2019/0082335 | A1 * | 3/2019 | Yu .......................... | H04B 7/088 |
| 2022/0021444 | A1 * | 1/2022 | Wei .................... | H04B 7/06964 |
| 2022/0086713 | A1 * | 3/2022 | Määttänen ...... | H04W 36/00837 |
| 2022/0376779 | A1 * | 11/2022 | Atungsiri ............. | H04B 7/2041 |

OTHER PUBLICATIONS

International Search Report and Written Opinion mailed on Jul. 15, 2022, received for PCT Application PCT/EP2022/058339, filed on Mar. 29, 2022, 10 pages.
3GPP, "Study on New Radio (NR) to support non terrestrial networks (Release 15)", 3GPP TR 38.811 V0.3.0, Dec. 2017, pp. 1-56.
3GPP, "Solutions for NR to support non-terrestrial networks (NTN) (Release 16)", 3GPP TR 38.821 V16.0.0, Dec. 2019, pp. 1-140.
Holma et al., "LTE for UMTS OFDMA and SC-FDMA Based Radio Access", John Wiley & Sons, 2009, pp. 1-433.
Hornillo-Mellado et al., "Prediction of Satellite Shadowing in Smart Cities with Application to IoT", SENSORS, vol. 20, No. 2, Jan. 14, 2020, pp. 1-19.
Mediatek Inc. "New Study WID on NB-IoT/eTMC support for NTN", 3GPP TSG RAN Meeting #86, RP-193235, Dec. 9-31, 2019, 4 pages.
3GPP, "Study on New Radio (NR) to support non-terrestrial networks (Release 15)", 3GPP TR 38.811 V15.4.0, Sep. 2020, pp. 1-127.

* cited by examiner

START

S870 Receive channel condition profile

S872 Identify one or more sub-periods of subsequent in-coverage period

S874 Transmit Scheduling Information

END

METHODS, COMMUNICATIONS DEVICE AND NON-TERRESTRIAL NETWORK INFRASTRUCTURE EQUIPMENT

CROSS-REFERENCE TO RELATED APPLICATIONS

The present application is based on PCT filing PCT/EP2022/058339, filed Mar. 29, 2022, and claims priority from European Patent Application No. 21166485.9, filed Mar. 31, 2021, the contents of each are incorporated by reference in their entireties.

BACKGROUND

Field of Disclosure

The present disclosure relates generally to communications devices, non-terrestrial network, NTN, infrastructure equipment and methods of operating communications devices and NTN infrastructure equipment.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the third generation partnership project (3GPP) defined UMTS and Long Term Evolution (LTE) architectures, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example, it is expected that future wireless communications networks will efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things" (IoT), and may typically be associated with the transmission of relatively small amounts of data with relatively high latency tolerance.

Accordingly, there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles. There is similarly expected to be a desire for such connectivity to be available over a wide geographic area.

One example area of current interest in this regard includes so-called "non-terrestrial networks", or NTN for short. The 3GPP has proposed in Release 15 of the 3GPP specifications to develop technologies for providing coverage by means of one or more antennas mounted on an airborne or space-borne vehicle [1]. Non-terrestrial networks may provide service in areas that cannot be covered by terrestrial cellular networks (i.e. those where coverage is provided by means of land-based antennas), such as isolated or remote areas, on board aircraft or vessels, or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

Although NTN networks can provide improved coverage for communications devices, particularly in remote areas, a nature of communications resulting from, for example, an increase in distance over which signals are communicated between an NTN infrastructure equipment and a communications device can create new challenges that need to be addressed.

SUMMARY

The present disclosure can help address or mitigate at least some of the issues discussed above.

According to one aspect, there is described a method of operating a communications device to transmit or to receive via a non-terrestrial network, NTN, infrastructure equipment. The method comprises detecting, by transceiver circuitry of the communications device, signals from the non-terrestrial infrastructure equipment during one of a plurality of in-coverage periods during which the communications device is in a coverage area of the NTN infrastructure equipment, because the communications device can receive signals transmitted either from the NTN infrastructure equipment carried by an aerial vehicle or relayed from the NTN infrastructure equipment via the aerial vehicle, as the aerial vehicle passes over the communications device. In one example, the aerial vehicle is a satellite, such as for example a low earth orbit satellite. Based on a determined profile of channel conditions with respect to time within the in-coverage period in which the signals from the NTN infrastructure equipment have been detected, the communications device can transmit signals carrying data in one or more sub-periods of a subsequent one of the in-coverage periods during which a transmission of signals by the communications device can provide a relative reduction in an amount of communications resources required to correctly communicate data carried by the transmitted signals compared with other sub-periods of the subsequent in-coverage period. Alternatively, or in addition, the communications device can receive signals carrying data in one or more sub-periods of a subsequent one of the in-coverage periods during which a reception of signals by the communications device transmitted by the NTN infrastructure equipment can provide a relative reduction in an amount of communications resources required to correctly communicate data carried by the received signals compared with other sub-periods of the in-coverage period.

According to example embodiments, by first measuring channel conditions for signals received by a communications device, transmitted by an NTN infrastructure equipment, during a period in which the NTN infrastructure equipment can serve the communications device as it passes over the communications device, a communications device can be scheduled by the wireless communications network or schedule itself to transmit or to receive signals carrying data during a part of a subsequent in-coverage period in which the channel conditions are better than another part of the subsequent in-coverage period. A distance travelled by the signals from the NTN infrastructure equipment, signal loss caused by obstructions and a speed of the NTN infrastructure equipment can produce a variation of the channel conditions during an in-coverage period. By first determining these conditions for an in-coverage period an improvement in communications can be achieved by selecting part or parts (one or more sub-periods) during which the channel conditions are better than others. It will be appreciated that a "passing over" the communications device does not necessarily imply that the aerial vehicle passes directly overhead the communications device. The aerial vehicle "passes over" the communications device if the aerial vehicle moves past the communications device when the aerial vehicle is in motion relative to the communications device. In one example, if the aerial vehicle is a satellite, the satellite "passes over" the communications device if the aerial vehicle moves past the communications device as part of the satellite's orbit about the Earth. The aerial vehicle "passing over" the communications device may be alternatively referred to herein as a "flypast" of the aerial vehicle with respect to the communications device. It will be appreciated that an in-coverage period is a time period during which the communications device is in a coverage area of the non-terrestrial infrastructure equipment as the aerial vehicle passes over or flies past the communications device. The communications device is capable of performing radio communication with the non-terrestrial infrastructure equipment when the communications device is in the coverage area of the non-terrestrial infrastructure equipment.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
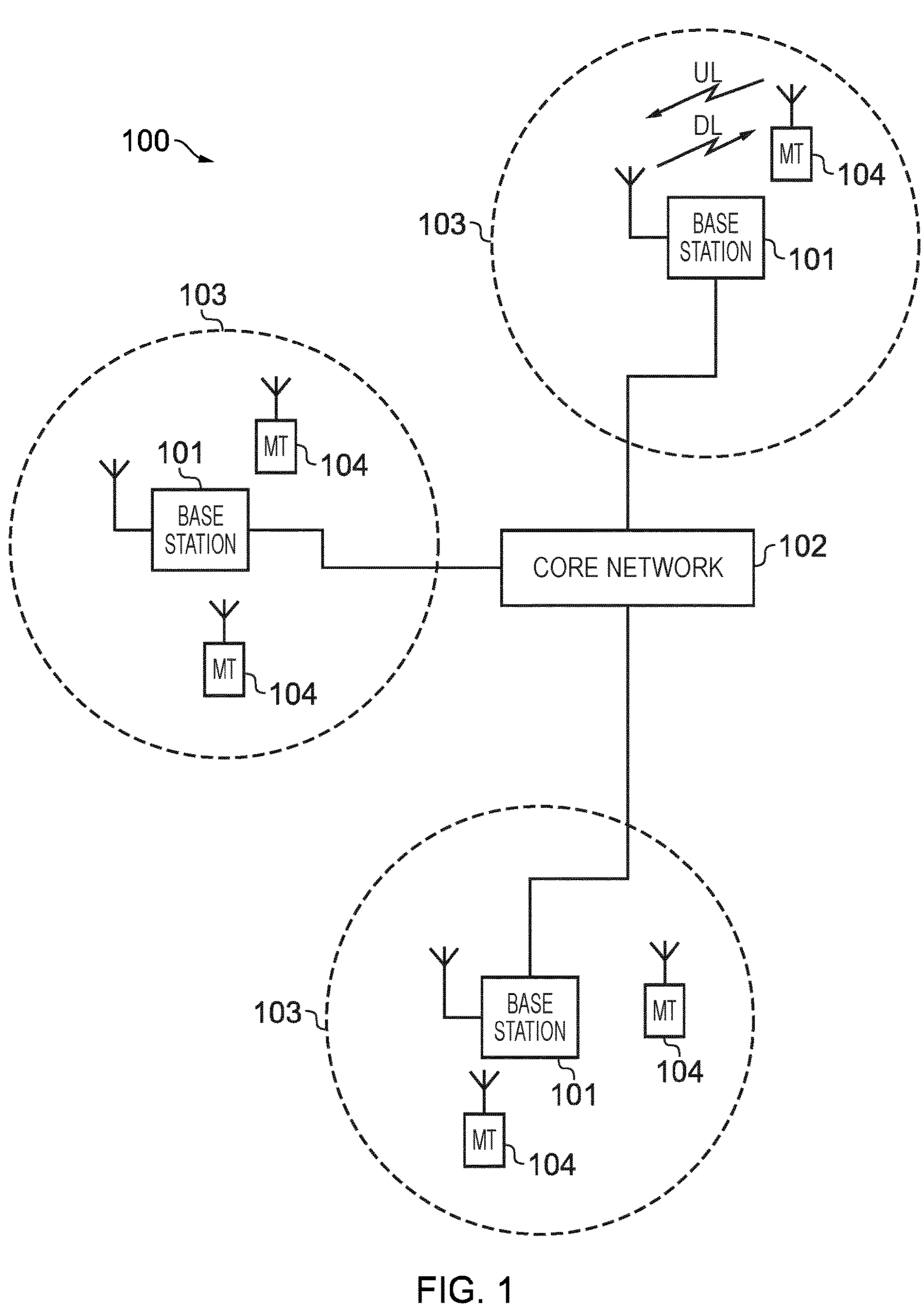
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs (eNB), g-nodeBs (gNB) and so forth. In this regard, different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G NR)

Figure 2:
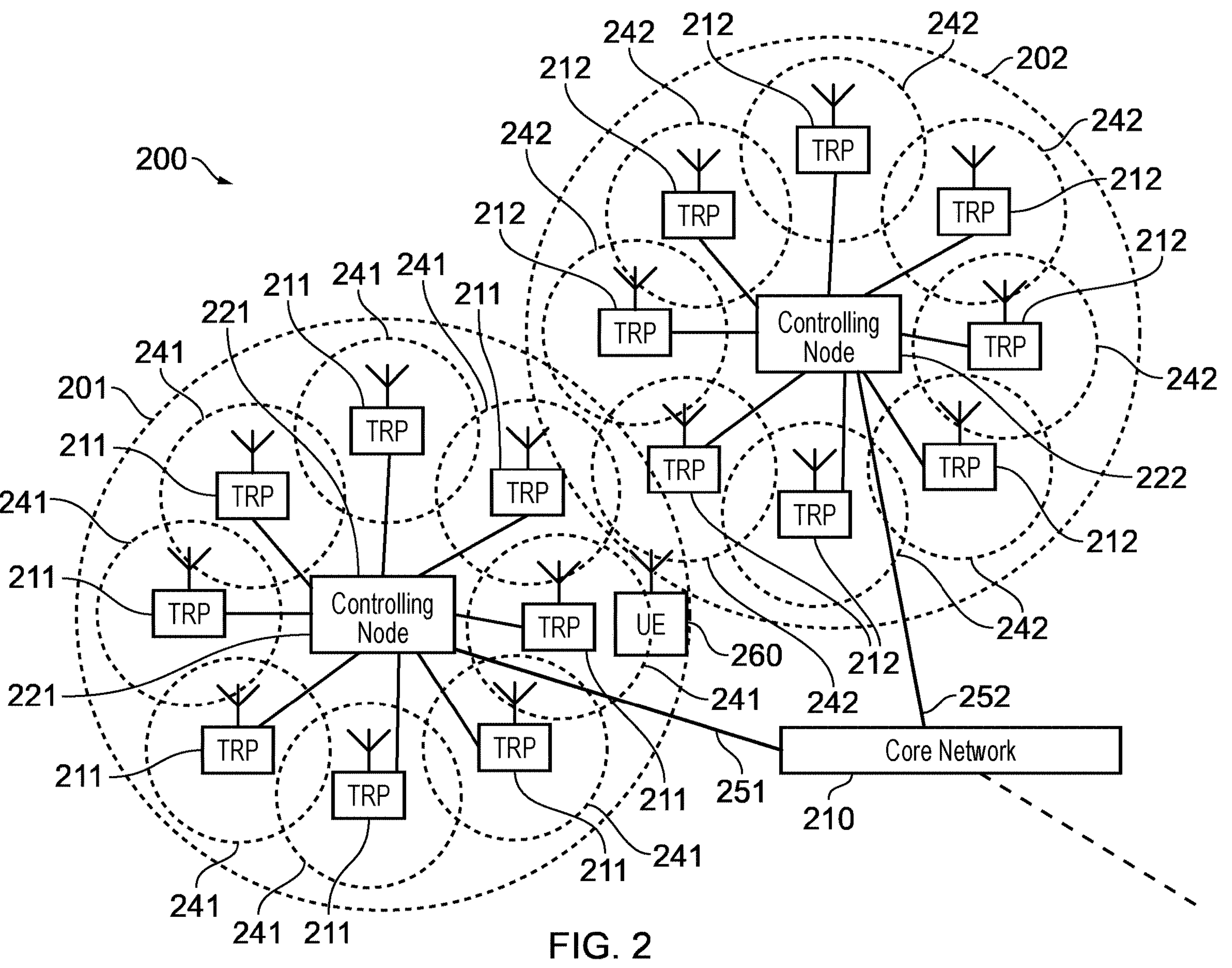
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units (DUs) 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
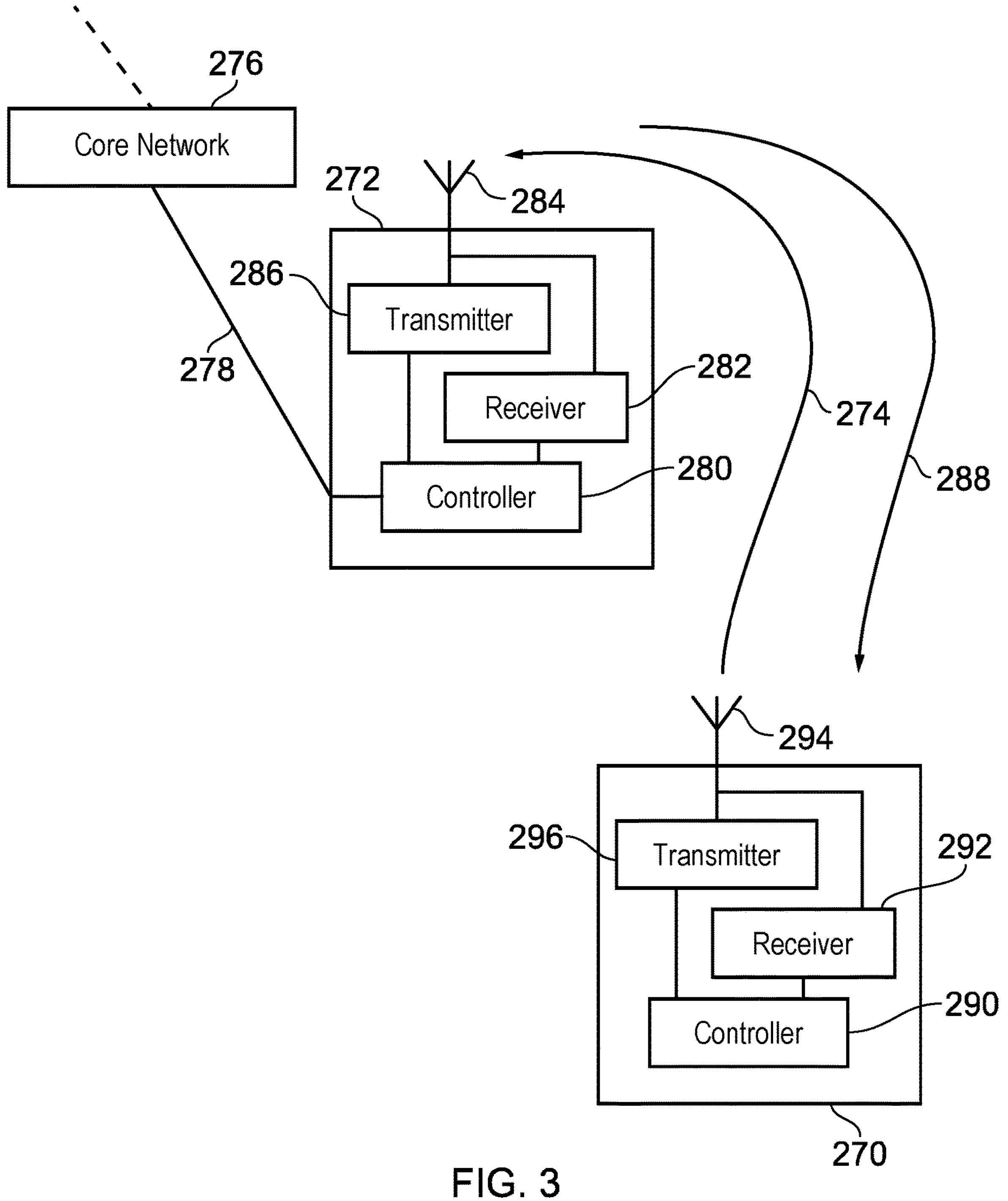
FIG. 3 is a schematic block diagram of an example infrastructure equipment and communications device configured in accordance with example embodiments.

A more detailed illustration of a communications device 270 and an example network infrastructure equipment 272, which may be thought of as an eNB or a gNB 101 or a combination of a controlling node 221 and TRP 211, is presented in FIG. 3. As shown in FIG. 3, the communications device 270 is shown to transmit uplink data to the infrastructure equipment 272 of a wireless access interface as illustrated generally by an arrow 274. The UE 270 is shown to receive downlink data transmitted by the infrastructure equipment 272 via resources of the wireless access interface as illustrated generally by an arrow 288. As with FIGS. 1 and 2, the infrastructure equipment 272 is connected to a core network 276 (which may correspond to the core network 102 of FIG. 1 or the core network 210 of FIG. 2) via an interface 278 to a controller 280 of the infrastructure equipment 272. The infrastructure equipment 272 may additionally be connected to other similar infrastructure equipment by means of an inter-radio access network node interface, not shown on FIG. 3.

The infrastructure equipment 272 includes a receiver 282 connected to an antenna 284 and a transmitter 286 connected to the antenna 284. Correspondingly, the communications device 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the communications device 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, which may be non-volatile memory, operating according to instructions stored on a computer readable medium.

Non-Terrestrial Networks (NTNs)

Figure 5:
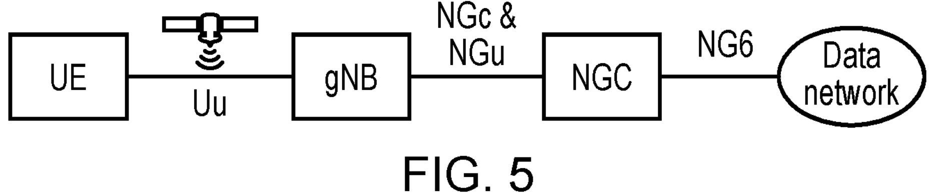
FIG. 5 is reproduced from [1], and illustrates a first example of a non-terrestrial network (NTN) featuring an access networking service based on a satellite/aerial platform with a bent pipe payload.
Figure 6:
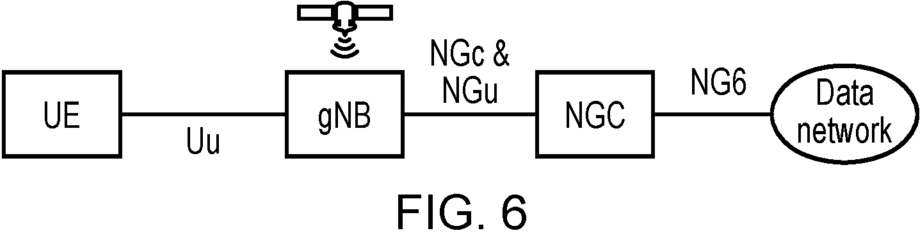
FIG. 6 is reproduced from [1], and illustrates a second example of an NTN featuring an access networking service based on a satellite/aerial platform connected to a gNodeB.

An overview of NR-NTN can be found in [1], and much of the following wording, along with FIGS. 5 and 6, has been reproduced from that document as a way of background.

In an NTN, an aerial vehicle (such as a satellite or aerial platform) may allow a connection of a communications device and a ground station (which may be referred to herein as an NTN gateway). In the present disclosure, the term aerial vehicle is used to refer to a space vehicle, aerial platform, or satellite, or any other entity which moves relative to a communications device and is configured to communicate with the communications device. In particular, an aerial vehicle may be in some embodiments a low earth orbit (LEO) satellite, a medium earth orbit (MEO) satellite, a high altitude platform system (HAPS), a balloon or a drone for example. As will be explained below, the aerial vehicle is configured to communicate with the communications device and the ground station of a terrestrial network by means of communications circuitry of the aerial vehicle.

As a result of the wide service coverage capabilities and reduced vulnerability of space/airborne vehicles to physical attacks and natural disasters, Non-Terrestrial Networks are expected to:

- foster the roll out of 5G service in un-served areas that cannot be covered by a terrestrial 5G network (isolated/remote areas, on board aircrafts or vessels) and under-served areas (e.g. sub-urban/rural areas) to upgrade the performance of limited terrestrial networks in a cost effective manner;
- reinforce the 5G service reliability by providing service continuity for M2M/IoT devices or for passengers on board moving platforms (e.g. passenger vehicles-aircraft, ships, high speed trains, bus) or ensuring service availability anywhere especially for critical communications, future railway/maritime/aeronautical communications; and to enable 5G network scalability by providing efficient multicast/broadcast resources for data delivery towards the network edges or even user terminal.

The benefits relate to either Non-Terrestrial Networks operating alone or to integrated terrestrial and Non-Terrestrial networks. They will impact at least coverage, user bandwidth, system capacity, service reliability or service availability, energy consumption and connection density. A role for Non-Terrestrial Network components in the 5G system is expected for at least the following verticals: transport, Public Safety, Media and Entertainment, eHealth, Energy, Agriculture, Finance and Automotive. It should also be noted that the same NTN benefits apply to 4G and/or LTE technologies and that while NR is sometimes referred to in the present disclosure, the teachings and techniques presented herein are equally applicable to 4G and/or LTE.

Figure 4:
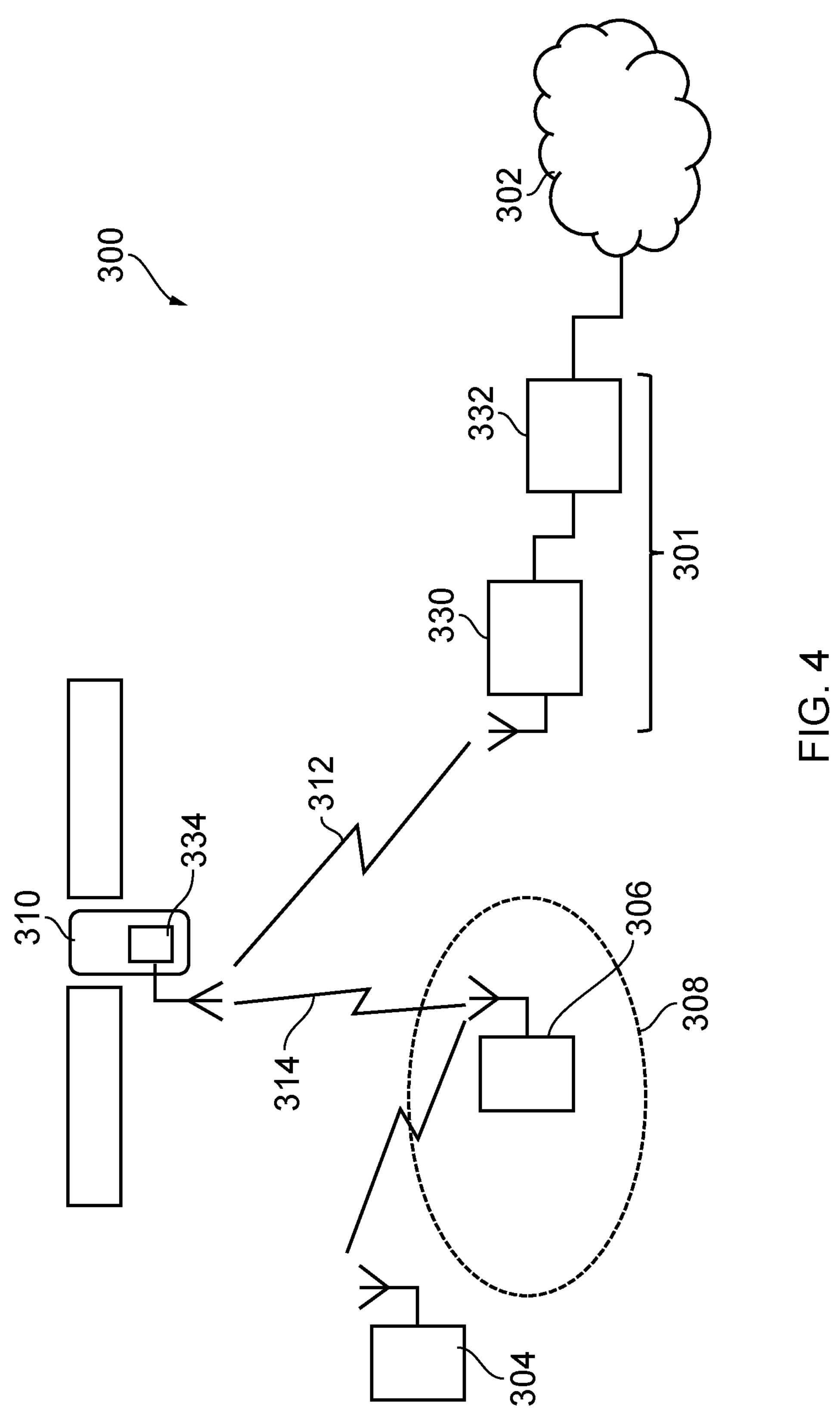
FIG. 4 schematically shows an example of a wireless communications system comprising an aerial vehicle and a terrestrial network which may be configured to operate in accordance with embodiments of the present disclosure.

FIG. 4 schematically shows an example of a wireless communications system 300 which may be configured to operate in accordance with embodiments of the present disclosure. The wireless communications system 300 in this example is based broadly around an LTE-type or NR-type architecture. Many aspects of the operation of the wireless communications system/network 300 are known and understood and are not described here in detail in the interest of brevity. Operational aspects of the wireless communications system 300 which are not specifically described herein may be implemented in accordance with any known techniques, for example according to the current LTE-standards or the proposed NR standards.

The wireless communications system 300 comprises a core network part 302 (which may be a 4G core network or a 5G core network) in communicative connection with a radio network part. The radio network part 301 comprises a base station 332 connected to a ground station (or NTN gateway) 330. The radio network part 301 may perform the functions of a base station 101 of FIG. 1, or may perform the functions of a controlling node and TRP of FIG. 2. In some embodiments, the base station 332 is an example of a non-terrestrial infrastructure equipment as explained below.

An aerial vehicle 310 includes communications circuitry 334. For example, the communications circuitry 334 may be non-terrestrial infrastructure equipment which is mounted on, and/or within the aerial vehicle 310. The communications circuitry 334 communicates via the ground station 330 with the base station 332 via a wireless communications link 312.

The communications circuitry 334 may communicate with a communications device 306, located within a cell 308, by means of a wireless access interface provided by a wireless communications link 314. For example, the cell 308 may correspond to the coverage area of a spot beam generated by the communications circuitry 334. The boundary of the cell 308 may depend on an altitude of the aerial vehicle 310 and a configuration of one or more antennas of the communications circuitry 334 by which the communications circuitry 334 transmits and receives signals on the wireless access interface. The spot beam may be an "earth fixed beam" which illuminates a geographic area on a surface of the earth for a pre-defined period of time. After the pre-defined period of time, the earth fixed beam may switch to serving a different geographic area on the surface of the earth. In such cases, the communications device 306 may be made aware of when the pre-defined period of time ends. In this way, the communications device 306 may determine to switch from being served by the aerial vehicle 310 to being served by another, different aerial vehicle (not shown) at the end of the pre-determined time period. Alternatively, the spot beam may be an "earth moving beam" which illuminates a constantly changing geographic area on the surface of the earth. In this case, the communications device 306 may determine to switch from being served by the aerial vehicle 310 to being served by the other aerial vehicle based on decision criteria. For example, the communications device 306 may determine to switch from being served by the aerial vehicle 310 to being served by the other aerial vehicle by determining that a distance between the communications device 306 and the aerial vehicle 310 is greater than a pre-defined distance. Alternatively, the communications device 306 may determine to switch from being served by the aerial vehicle 310 to being served by the other aerial vehicle by determining that the distance between the communications device 306 and the aerial vehicle 310 is greater than a distance between the communications device 306 and the other aerial vehicle.

The aerial vehicle 310 may be a satellite in an orbit with respect to the Earth. According to example embodiments, the satellite may be in a non-geostationary orbit (NGSO), so that the satellite moves with respect to a fixed point on the Earth's surface. An example of an NGSO is an LEO, in which case the satellite may complete an orbit of the Earth relatively quickly, thus providing moving cell coverage.

In FIG. 4, the ground station 330 is connected to the communications circuitry 334 by means of a wireless communications link 312. The communications circuitry 334 receives signals representing downlink data transmitted by the radio network part 301 on the wireless communications link 312 and, based on the received signals, transmits signals representing the downlink data via the wireless communications link 314 providing the wireless access interface for the communications device 306. Similarly, the communications circuitry 334 receives signals representing uplink data transmitted by the communications device 306 via the wireless access interface comprising the wireless communications link 314 and transmits signals representing the uplink data to the ground station 330 on the wireless communications link 312. The wireless communications links 312, 314 may operate at a same frequency, or may operate at different frequencies.

The extent to which the communications circuitry 334 processes the received signals may depend upon a processing capability of the communications circuitry 334. For example, the communications circuitry 334 may receive signals representing the downlink data on the wireless communication link 312, amplify them and (if needed) re-modulate onto an appropriate carrier frequency for onwards transmission on the wireless access interface provided by the wireless communications link 314.

FIG. 5 illustrates an example of an NTN architecture based on a communications circuitry of an aerial vehicle operating in a transparent manner, meaning that a signal received from the communications device at the aerial vehicle is forwarded (to the communications device, to a ground station on Earth or to another aerial vehicle) with only frequency conversion and/or amplification. A wireless access interface (such as an NR Uu interface) may be generated at a base station located on the Earth, and connects the base station (gNB, in the example of FIG. 5) and the communications device (UE). In such embodiments, the base station may be regarded as a non-terrestrial infrastructure equipment, and communications are relayed between the non-terrestrial infrastructure equipment and the communications device 306.

Alternatively, the communications circuitry 334 of the aerial vehicle 310 may be configured to decode the signals representing the downlink data received on the wireless communication link 312 into un-encoded downlink data, re-encode the downlink data and modulate the encoded downlink data onto the appropriate carrier frequency for onwards transmission on the wireless access interface provided by the wireless communications link 314.

The communications circuitry 334 may be configured to perform some of the functionality conventionally carried out by a base station (e.g. a gNodeB or an eNode B), such as base station 101 of FIG. 1. In particular, latency-sensitive functionality (such as acknowledging a receipt of the uplink data, or responding to a RACH request) may be performed by the communications circuitry 334 partially implementing some of the functions of a base station. In such embodiments, the communications circuitry 334 of the aerial vehicle 310 may be regarded as a non-terrestrial infrastructure equipment. In such arrangements, there may be a physical (e.g. wired, or fibre optic) connection on board the aerial vehicle 310 which provides the coupling between the circuitry of the communications circuitry 334 which implements base station functionality and a transceiver of the communications circuitry 334 which is configured communicate with the communications device 306 and the ground station 330. In such arrangements, a wireless communications feeder link between the communications circuitry 334 and the ground station 330 may provide connectivity between the communications circuitry 334 and the core network part 302. In such arrangements, the base station 332 may not be present.

FIG. 6 illustrates an example of an NTN architecture based on a communications circuitry of an aerial vehicle implementing at least some base station functionality. In this example NTN, the communications circuitry 334 is an example of non-terrestrial infrastructure equipment. The communications circuitry 334 generates the wireless access interface (e.g. the Uu interface) which connects the aerial vehicle and the communications device. For example, the communications circuitry 334 may decode a received signal, and encode and generate a transmitted signal. As such, the communications circuitry 334 may include some or all of the functionality of a base station (such as a gNodeB or eNodeB). A further connection between the communications circuitry 334 and a ground station (such as an NTN gateway) may be by means of a separate wireless access interface, and may form part of a connection between the communications circuitry 334 and a core network.

In some cases, the communications device 306 shown in FIG. 4 may be configured to act as a relay node. That is, it may provide connectivity to one or more terminal devices such as the terminal device 304. When acting as a relay node, the communications device 306 transmits and receives data to and from the terminal device 304, and relays it, via the aerial vehicle 310 to the ground station 330. The communications device 306, acting as a relay node, may thus provide connectivity to the core network part 302 for terminal devices which are within a transmission range of the communications device 306.

It will be apparent to those skilled in the art that many scenarios can be envisaged in which the combination of the communications device 306 and the aerial vehicle 310 can provide enhanced service to end users. For example, the communications device 306 may be mounted on a passenger vehicle such as a bus or train, which travels through rural areas where coverage by terrestrial base stations may be limited. Terminal devices on the vehicle may obtain service via the communications device 306 acting as a relay, which communicates with the communications circuitry 334.

In some cases, communications circuitry 334 of an aerial vehicle 310 may comprise a plurality of antennas configured to generate a corresponding plurality of spot beams. Each of the plurality of spot beams may illuminate a different area of the Earth's surface to provide a plurality of cells (such as cell 308) each corresponding to a coverage area of one of the plurality of spot beams. The aerial vehicle 310 may communicate with a communications device (such as communications device 306) located in any of the plurality of cells provided by the plurality of spot beams by means of a wireless access interface provided by a wireless communications link (such as wireless communications link 314) to the communications device. The boundary of each of the plurality of cells may depend on an altitude of the aerial vehicle 310 and a configuration of the plurality of antennas of the aerial vehicle 310 by which the aerial vehicle 310 transmits and receives signals on the wireless access interface.

In such configurations, each of the plurality of cells has a different Physical Cell Identity (PCI). Accordingly, reference signals and scrambling codes used may be different for each of the plurality of cells, and each of the plurality of cells are scheduled independently of each other. Furthermore, if a communications device intends to switch from being served from a first of the plurality of cells to a second of the plurality of cells, then a handover procedure must be performed between the first and second cells even though the communications device would still be served by the same aerial vehicle. The handover procedure may consist of a connected mode handover, a cell selection procedure or a cell reselection procedure. The handover procedure may be controlled by measurements made by the communications device and communicated to the base station, controlled by measurements made by the base station, controlled by declaration of radio link failure by the communications device or by other means.

There is a need to ensure that connectivity for the communications device 306 with the ground station 330 can be maintained, in light of the movement of the communications device 306, the movement of the aerial vehicle 310 (relative to the Earth's surface), or both. According to conventional cellular communications techniques, a decision to change a serving cell of the communications device 306 may be based on measurements of one or more characteristics of a radio frequency communications channel, such as signal strength measurements or signal quality measurements. In a terrestrial communications network, such measurements may effectively provide an indication that the communications device 306 is at, or approaching, an edge of a coverage region of a cell, since, for example, path loss may broadly correlate to a distance from a base station. However, such conventional measurement-based algorithms may be unsuitable for cells generated by means of the transmission of beams from communications circuitry 334 of an aerial vehicle, such as the cell 308 generated by the aerial vehicle 310.

A further challenge of conventional techniques may be the relatively high rate at which cell changes occur for the communications device 306 obtaining service from one or more aerial vehicles. For example, where the aerial vehicle 310 is an LEO satellite, the aerial vehicle 310 may complete an orbit of the Earth in around 90 minutes; the coverage of a cell generated by the aerial vehicle 310 will move very rapidly, with respect to a fixed observation point on the surface of the Earth (in one example, an LEO may move at 7.56 km/s as explained above). Similarly, it may be expected that the communications device 306 may be mounted on an airborne vehicle itself, typically having a ground speed of several hundreds of kilometres per hour. However, it will be appreciated that a speed of the aerial vehicle 310 relative to a fixed point on the Earth is generally much larger than typical speeds of airborne vehicles configured to mount the communications device 306.

Satellite Positional Information

One particular difficulty associated with NTNs is the large distances and relative speeds between a UE (such as communications device 306) and an eNB (such as base station 332 or a base station implemented in the communications circuitry 334) compared to terrestrial networks. For example, for an LEO, the distance between the satellite and the UE may be between 600 km to 1200 km. Hence, the propagation delay between the UE (hereinafter the term UE is used to refer to any communications device configured to communicate with a non-terrestrial infrastructure equipment of an NTN) and the eNB is significantly larger than for terrestrial networks, particularly in a 'transparent' arrangement such as that shown in FIG. 5. For example, for an NTN using a transparent LEO satellite in a 600 km high orbit, the Round Trip Time (RTT) between the UE and the eNB may be between approximately 8 ms to approximately 26 ms [3].

In order to take into account this large propagation delay, uplink transmissions would need to apply a large Timing Advance (TA) and the eNB would need to take this into account for scheduling of uplink data. The timing advance that needs to be applied depends on the location of the UE within the cell footprint of the satellite. Since the cell footprint can be large, there can be a large variation of the timing advance that needs to be applied, depending on the UE location within the cell footprint.

In addition to the increased RTT between the UE and the eNB, the NTN system also needs to take into account the movement of the satellite. For example, a LEO satellite can be travelling at 7.56 km/second (27,216 km/h) relative to the UE, which would cause significant Doppler shift that the UE needs to compensate for. In order to factor in the Doppler shift, i.e. in order to apply a pre-compensation for the frequency of the uplink transmissions, the UE needs to know its own geo-location and the motion (e.g. position and velocity) of the satellite. The geo-location of the UE can, for example, be obtained from a Global Navigation Satellite System (GNSS) or from any other suitable means.

The position and velocity of the satellite can be derived from the satellite ephemeris information, that is the satellite orbital trajectory, which can be periodically broadcast to the UE, e.g. via System Information Blocks (SIBs). However, broadcasting ephemeris information, e.g. every 100 ms, can lead to high signaling overhead.

Furthermore, signaling ephemeris information does not take into account perturbations in the satellite orbit and hence may not provide sufficient accuracy to determine the required timing advance and frequency compensation. In particular, satellites in LEO do not exist in a perfect vacuum and thus experience a number of factors such as varying drag coefficients or gravitational forces which perturb the orbit of the satellite. As such, as the time since a UE last received a periodic broadcast of the satellite ephemeris information increases, the accuracy with which the UE can accurately determine the position and velocity of the satellite decreases.

One possibility is that instead of sending ephemeris information, the eNB or an NTN Gateway can derive the satellite position and velocity and broadcast it via the SIBs. The satellite position and velocity may be determined by the eNB or NTN Gateway, for example, via GNSS or other suitable means. The eNB or NTN Gateway may determine the satellite position and velocity via communications on the network itself, or the eNB or NTN Gateway may determine the satellite position and velocity by other means, separate from the network. For example, the eNB or NTN Gateway may derive the satellite position and velocity, e.g. via a telemetry link to the satellite, and the eNB may transmit that information in the SIBs. The eNB/NTN Gateway may estimate satellite position and velocity at the System Frame Number (SFN) in which the SIB is broadcasted, thereby providing real time position and velocity information. Hereinafter, the term 'eNB' is used to refer to any of a base station, a gNB, an eNB or an NTN gateway, unless explicitly stated otherwise.

Time Spent in Beam Footprint

As explained above, the large distances and relative speeds between the UE and the eNB for NTNs compared to terrestrial networks lead to technical challenges. Another associated difficulty for NTNs compared to terrestrial networks is that the UE spends a relatively short time in a coverage area of the cell compared to terrestrial networks. The time which a UE spends in the coverage area of a cell for NTNs depends on a distance between the UE and a satellite (which may or may not be co-located with the eNB as explained above), a speed of the UE relative to the satellite and a width of a spot beam generated by the satellite which provides the coverage area.

In one example, a LEO orbiting the Earth at an altitude of 600 km and generating a spot beam operating at a carrier frequency of 2 GHz may have an 3 dB angular beamwidth of 4.4127 degrees (corresponding to a 46 km beamwidth when the LEO is at its zenith) [3]. For a LEO moving at 7.56 km/sec, the UE will be in the coverage area of the spot beam for only 6.1 seconds.

Pathloss in NTNs

Another difficulty associated with NTNs, as explained in more detail with reference to FIG. 7 below, is variability in a quality of channel conditions between the UE and the satellite. As the satellite is in motion with respect to the UE, communication paths for radio signals between the UE and the satellite may become obstructed by an obstacle (for example, a tree or building), resulting in a decrease in a quality of channel conditions between the satellite and the UE. At a later time, the communication paths for radio signals between the UE and the satellite may become unobstructed as the satellite moves past the obstacle resulting in an increase in the quality of channel conditions between the satellite and the UE. As will be explained below, if the quality of the channel conditions increases, then fewer repetitions are required to successfully communicate data represented by the signals between the satellite and the UE than if the quality of channel conditions was lower. As will be appreciated, using fewer repetitions means fewer communications resources are required to successfully communicate the data represented by the signals between the satellite and the UE. The term "communications resources" as used herein is referring to time and frequency resources for communicating data as will be appreciated by one skilled in the art.

Additionally, in cases where a data rate for communicating data between the satellite and the UE is fixed, an increase in the quality of the channel conditions results in a greater likelihood that data representing signals being transmitted in the channel will be successfully communicated.

In such examples, the communication paths may represent one or more physical paths over the air for transmission of radio signals between the UE and the satellite. The quality of the channel conditions may be represented by pathloss in some examples, and in particular, an increase in pathloss represents a decrease in the quality of the channel conditions and vice versa. As will be appreciated, pathloss is a measure of an attenuation of a radio signal between a transmitter and a receiver. Pathloss is comprised of "free space pathloss" which represents an attenuation of a radio signal due to propagation of the radio signal between the transmitter and the receiver over the air and "additional pathloss" which represents an additional attenuation of the radio signal due to one or more obstacles which block a line of sight path between the transmitter and the receiver.

Figure 7:
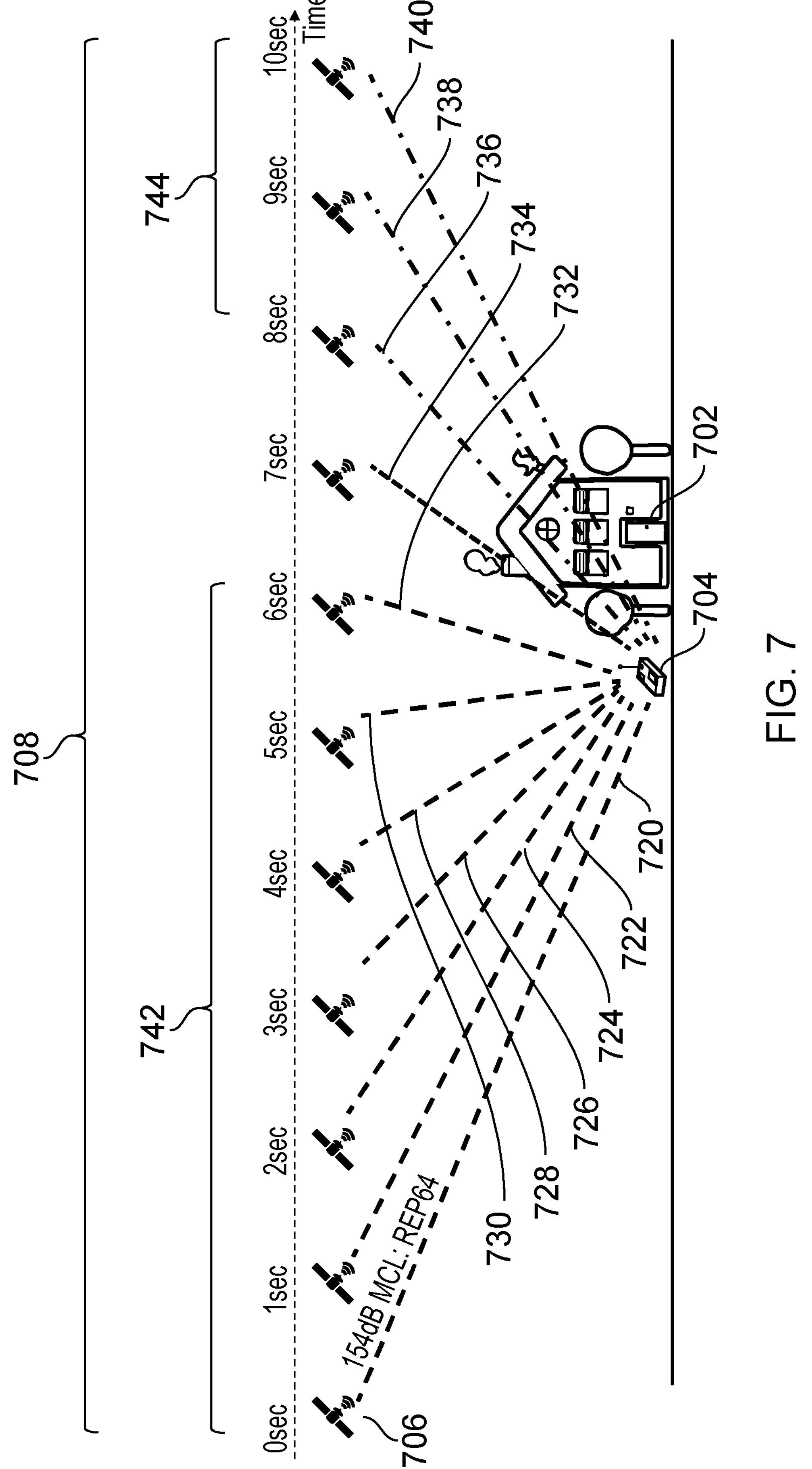
FIG. 7 schematically illustrates communication paths between a communications device and a satellite which traverses the sky with time in accordance with example embodiments.

FIG. 7 illustrates communication paths between a communications device and a satellite which traverses the sky over time. In particular, FIG. 7 is a schematic representation of a satellite 706 (which is an example of the aerial vehicle 310) in motion with respect to a communications device 704 during a part of the satellite's orbit. A base station may be implemented in the satellite 706 or may be implemented in a terrestrial station such as base station 332 as explained above. The communications device 704 may represent a specific implementation of communications device 306. A plurality of communications paths 720-740 for respective times during the motion of the satellite 706 are shown. The plurality of communications paths 720-740 represent line-of-sight physical paths for transmission of radio signals between the satellite 706 and the communications device 704 at respective times during the satellite's motion. In other words, each of the plurality of communications paths 720-740 represents a line-of-sight physical path for transmission of radio signals between the communications device 704 and the satellite 706 at different times during the satellite's motion.

As explained with reference to FIG. 6 above, a boundary of the coverage area of the satellite 706 may depend on an altitude of the satellite 706 and a configuration of one or more antennas of the satellite 706 by which the satellite 706 transmits and receives signals. As the satellite 706 in FIG. 7 is in motion with respect to the communications device 704, the communications device 704 may only be in the coverage area for a fraction of each orbit of the satellite 706. A time period for which the communications device 704 is in the coverage area of the satellite 706 during each orbit of the satellite 706 will be referred to herein as an "in-coverage period". As shown in FIG. 7, the communications device 704 is in the coverage area of the satellite for a ten second time period 708. Accordingly, the ten second time period 708 may be referred to as an "in-coverage period". It will be appreciated the communications device 704 spends a relatively short period of time in the coverage area of the satellite 706.

As shown in FIG. 7, communication paths 720-732 for an unobstructed time period 742 within the in-coverage period 708 are relatively unobstructed. In other words, the pathloss for each of the unobstructed communication paths 720-732 is comprised mainly of a free space pathloss. By contrast, obstructed communication paths 736-740 for a later obstructed time period 744 within the in-coverage period 708 are obstructed by an obstacle 702. In other words, the obstacle 702 causes additional pathloss for each of the obstructed communications paths 736-740 for the later obstructed time period 744 within the in-coverage period 708. The obstacle may comprise trees and/or buildings for example as shown in FIG. 7. In this example, the unobstructed time period 742 and the later obstructed time period 744 within the in-coverage period 708 are examples of "sub-periods" of the in-coverage period 708.

Figure 8:
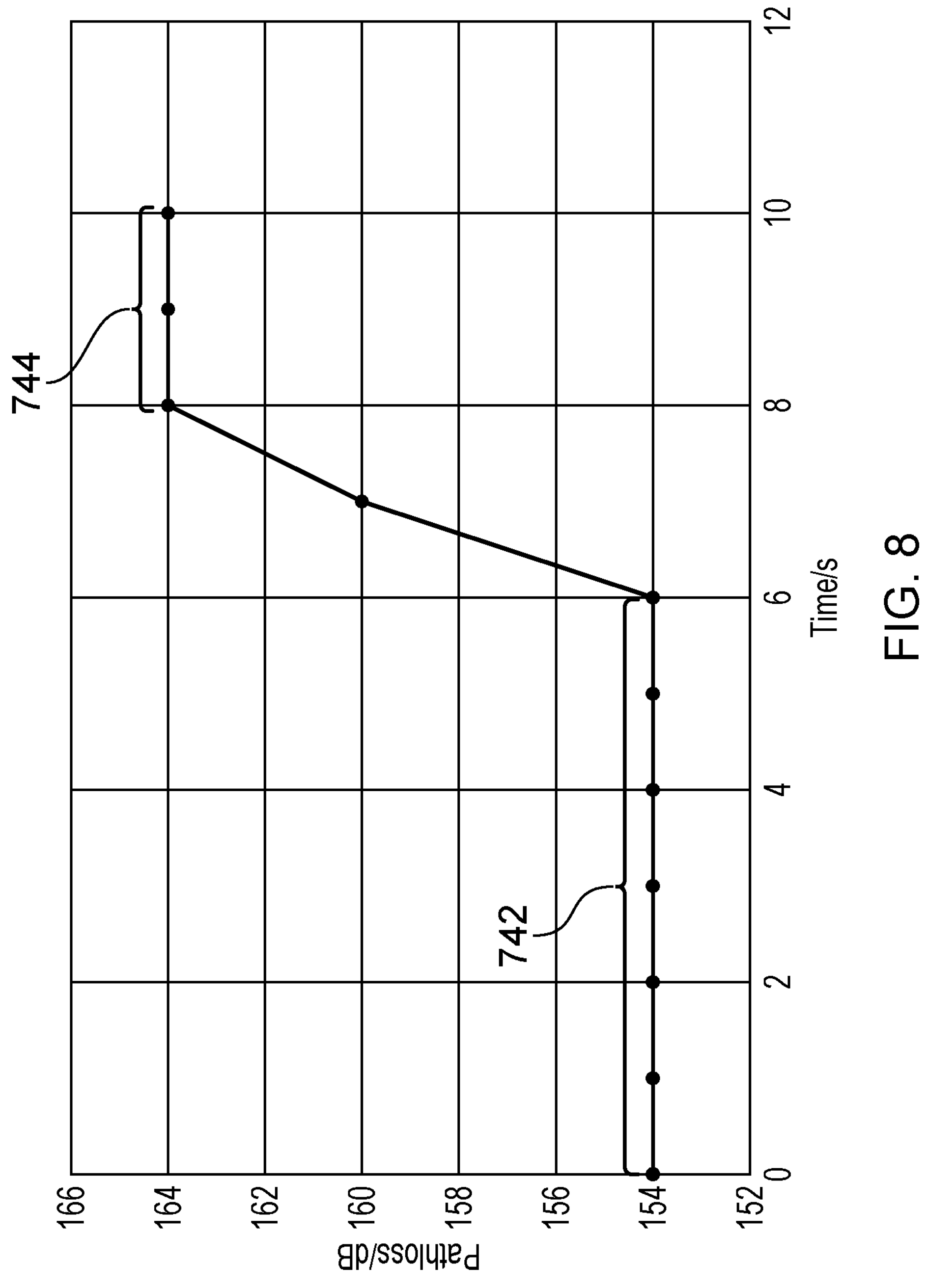
FIG. 8 is a graphical representation of a variation in pathloss with respect to time for transmission of radio signals between a communications device and an aerial vehicle in accordance with example embodiments.

FIG. 8 is a graphical representation of a variation in pathloss with respect to time for transmission of radio signals between the communications device 704 and the satellite 706. For simplicity, the pathloss represented in FIG. 8 only takes into account the variation of the pathloss due to obstructions (additional pathloss) and not the variation of free space pathloss. For example, although FIG. 8 represents pathloss as being constant for the unobstructed time period 742, it will be appreciated by one skilled in the art that if this pathloss accounted for variations in free space pathloss then the pathloss would decrease with time during the unobstructed time period 742 because a distance between the satellite 706 and the communications device 704 decreases as time increases during the unobstructed time period 742. As will be appreciated from FIG. 8, a pathloss for radio signals being transmitted over the unobstructed communications paths 720-732 for the unobstructed time period 742 is lower than a pathloss for radio signals being transmitted over the obstructed communication paths 736-740 for the later obstructed time period 744.

As will be appreciated, a quality of the channel conditions for the obstructed time period 744 is worse than for the unobstructed time period 742. In other words, in the unobstructed time period 742, fewer communication resources are required to successfully communicate the data represented by the signals between the communications device 704 and the satellite 706. Alternatively, a likelihood of successful communication of data between the communications device 704 and the satellite 706 may be lower for the obstructed time period 744 unless a greater amount of communications resources are used to transmit the data for the obstructed time period 744.

For example, in order to ensure successful transmission of data represented by radio signals when a pathloss is high, a larger number of repetitions may be required for transmissions between the transmitter and the receiver compared with when the pathloss is lower. In particular, it will be appreciated by one skilled in the art that an increase in pathloss of a transmission represents a decrease in signal-to-noise-ratio (SINR). Accordingly, a length of the transmission should be increased (preferably, by increasing the number of repetitions in the transmission) to increase a likelihood that the transmission can be successfully received and decoded by the receiver.

For the unobstructed time period 742, in an example, a required number of repetitions for Physical Uplink Shared Channel (PUSCH) transmissions is 64. By contrast, at time 7 seconds when radio signals are being transmitted over a partially obstructed communication path 734, the required number of repetitions for PUSCH transmissions is 256. As will be appreciated, for the later obstructed time period 744, the required number of repetitions for PUSCH transmissions is higher than 256.

In one example, for eMTC, approximately 256 repetitions may be required to overcome free space pathloss. When additional pathloss is considered, the transmitter may be required to transmit or receive transport blocks with up to 2048 repetitions. Such transmissions would last for 2.048 seconds.

In another example, for NB-IoT, a UE can be scheduled with up to 10 resource units (RUs) per repetition. As will be appreciated, an RU is a multiplication of a number of consecutive sub-carriers in frequency and consecutive Orthogonal Frequency Division Multiplexing (OFDM) symbols in time, and represents a basic unit of shared channel allocation in NB-IoT. As an RU may occupy up to 32 ms (for a 3.75 kHz subcarrier spacing), a single repetition in NB-IoT can occupy up to 320 ms. As a UE may be scheduled with up to 128 repetitions, a transmission in NB-IoT can extend for up to 4.096 seconds.

As explained above, increasing a number of repetitions in a transmission increases a likelihood of successful reception and decoding. However, using a larger number of repetitions increases power consumption at the UE and decreases cell spectral efficiency. Typically, in NTNs, free space pathloss is larger than compared with terrestrial networks because of the large distances between the UE and the satellite, and the additional pathloss is increased due to obstacles which may block line of sight paths between the satellite and the UE. Therefore, a large number of repetitions are used to ensure successful reception and decoding of the transmission. Furthermore, as explained above, pathloss is variable in NTNs because the satellite is in motion with respect to the UE. Accordingly, ensuring successful transmission of data represented by radio signals in an NTN while minimising UE power consumption and maximising cell spectral efficiency, represent technical challenges.

In view of the above-mentioned technical challenges, there is provided a method of operating a communications device to transmit or to receive via a non-terrestrial network, NTN, infrastructure equipment. The method comprises detecting, by transceiver circuitry of the communications device, signals from the non-terrestrial infrastructure equipment during one of a plurality of in-coverage periods during which the communications device is in a coverage area of the NTN infrastructure equipment, because the communications device can receive signals transmitted either from the NTN infrastructure equipment carried by an aerial vehicle or relayed from the NTN infrastructure equipment as the aerial vehicle passes over the communications device. Based on a determined profile of channel conditions with respect to time within the in-coverage period in which the signals from the NTN infrastructure equipment have been detected, the transceiver circuitry of the communications device either transmits signals carrying data in one or more sub-periods of a subsequent one of the in-coverage periods during which a transmission of signals by the communications device can provide a relative reduction in an amount of communications resources required to correctly communicate data carried by the transmitted signals compared with other sub-periods of the subsequent in-coverage period, or receives signals carrying data in one or more sub-periods of a subsequent one of the in-coverage periods during which a reception of signals by the communications device transmitted by the NTN infrastructure equipment can provide a relative reduction in an amount of communications resources required to correctly communicate data carried by the received signals compared with other sub-periods of the in-coverage period.

Figure 9:
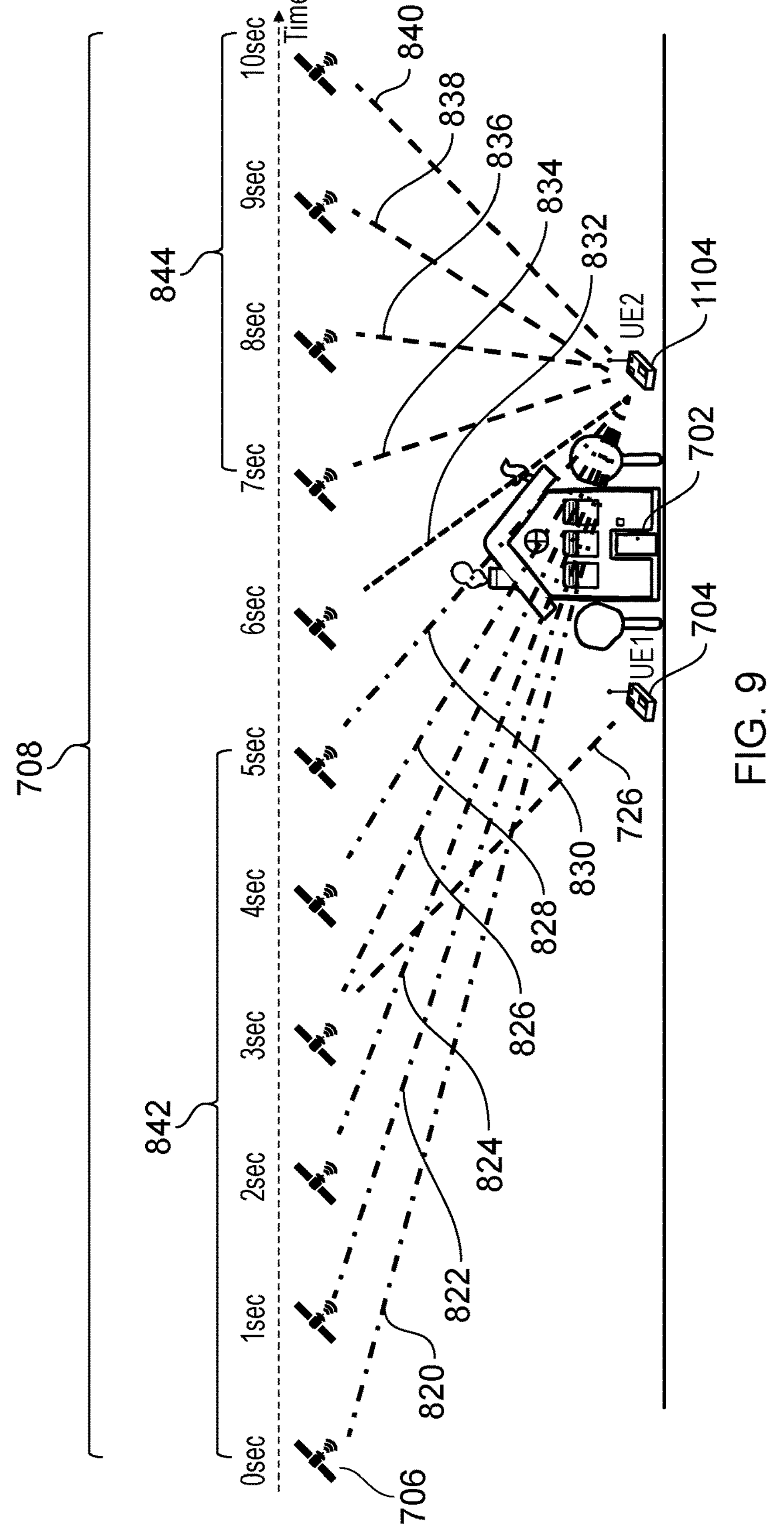
FIG. 9 is based on FIG. 7 but additionally shows a plurality of communication paths between a second communications device on a different side to a first communications device of an obstacle affecting the communications conditions with an aerial vehicle differently.

FIG. 9 is based on FIG. 7 but additionally shows a plurality of communication paths 820-840 between a second communications device 1104 on another side of the obstacle 702 than a first communications device 704, which is the communications device shown in FIG. 7. Communication paths 720-724, 728-740 for the first communications device 704 are not shown for clarity.

The second communications device 1104 on the other side of the obstacle 702 may represent a specific implementation of communications device 306. As shown in FIG. 9, obstructed communication paths 820-830 for an obstructed time period 842 are obstructed by the obstacle 702 while unobstructed communications paths 834-840 are relatively unobstructed. In other words, the obstacle 702 causes additional pathloss for each of the obstructed communications paths 820-830 for the obstructed time period 842.

Figure 10:
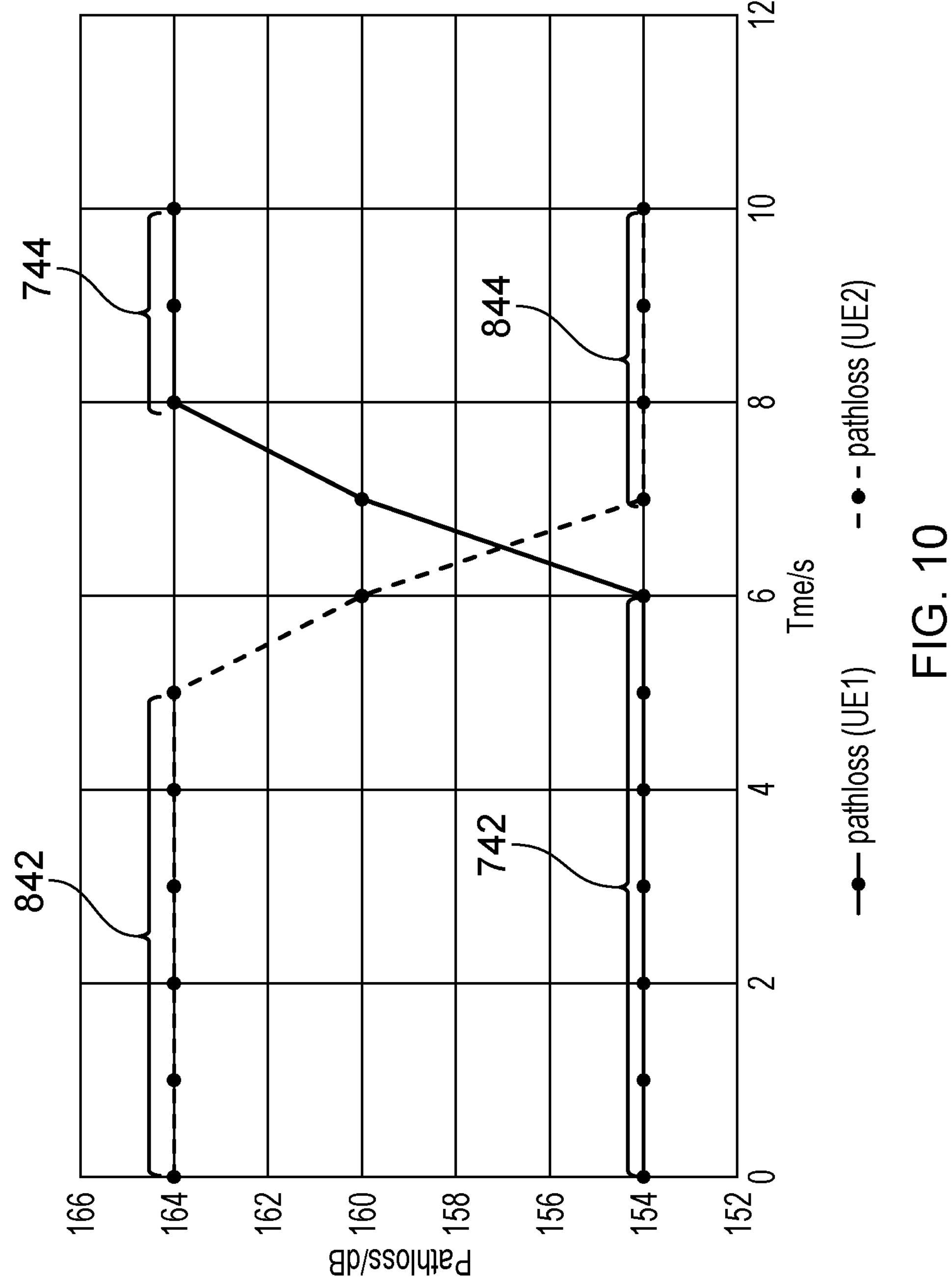
FIG. 10 graphical representation of a variation in pathloss with respect to time for transmission of radio signals between a communications device and an aerial vehicle in accordance with example embodiments.

FIG. 10 is a graphical representation of a variation in pathloss with respect to time for transmission of radio signals between the communications device 704 and the satellite 706 and for transmission of radio signals between the communications device 1104 on the other side of the obstacle 702 and the satellite 706. For simplicity, the pathloss represented in FIG. 10 only takes into account the variation of pathloss due to obstructions (additional pathloss) and not the variation of free space pathloss. As will be appreciated from FIG. 10, a pathloss for radio signals being transmitted over the unobstructed communication paths 720-732 for the communications device 704 is lower than a pathloss for radio signals being transmitted over obstructed communication paths 820-828 for the same time period. However, a pathloss for radio signals being transmitted over the obstructed communication paths 736-740 between the communications device 704 and the satellite 706 is higher than a pathloss for radio signals being transmitted over the unobstructed communication paths 836-840 for the same time period.

As will be appreciated from FIGS. 7 to 10 explained above, pathloss for transmission of radio signals between different communications devices and a satellite in a NTN may be variable in time such that, at a given point in time, one communications device may have a lower or higher pathloss with a satellite than another communications device.

FIGS. 7 to 10 represent a ten second in-coverage period 708 of the orbit of the satellite 706 when the communications devices 704, 1104 are in a coverage area of the satellite 706. As will be appreciated by one skilled in the art, provided the communications devices 704, 1104 have not moved significantly, the pathloss profiles shown in FIGS. 8 and 10 may be substantially the same for one or more subsequent in-coverage periods when the satellite 706 flies past the communications devices 706, 1104 as part of its orbit about the earth. In other words, the variation in pathloss with time shown in FIGS. 8 and 10 may be substantially the same at a time one orbital period of the satellite 706 later than the time shown in FIGS. 8 and 10. Accordingly, it becomes possible to predict a variation in pathloss with time for communications devices in an NTN for subsequent flypasts of the satellite 706.

Figures 11A, 11B:
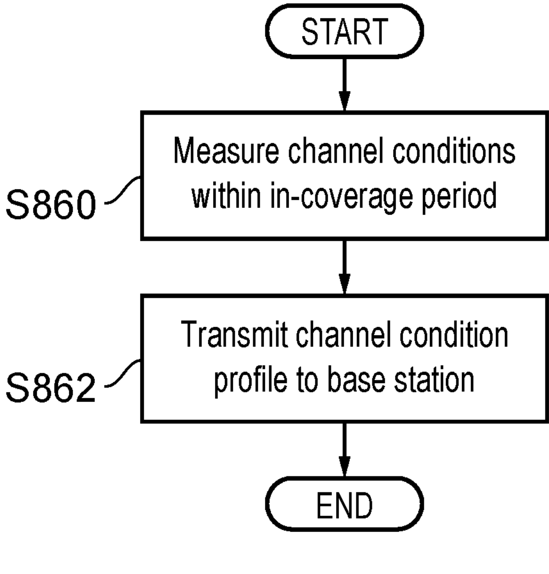
FIG. 11A is a flow diagram illustrating steps performed by a communications device in an NTN in accordance with example embodiments.
FIG. 11B is a flow diagram illustrating steps performed by a base station in an NTN in accordance with example embodiments.

FIG. 11A is a flow diagram illustrating steps performed by a communications device in an NTN (such as communications device 704) in accordance with example embodiments.

In step S860, the communications device 704 measures channel conditions with respect to time within an in-coverage period. The measuring of the channel conditions may comprise measuring one or more of a pathloss, a reference signal received power (RSRP) and channel state information (CSI) during the in-coverage period. The CSI may comprise one or more of a channel quality indication (CQI), a precoding matrix indication (PMI) and a rank indication (RI). The measurements may be made for some or all of the in-coverage period. A decrease in a quality of the channel conditions (for example, an increase in pathloss or a decrease in RSRP) means that data is less likely to be successfully transmitted between the communications device 704 and the satellite 706 and vice versa. Measurements of channel conditions with respect to time may be referred to as a “channel condition profile”.

In step S862, the communications device 704 transmits a representation of the channel condition profile for the in-coverage period 708. The representation of the channel condition profile for the in-coverage period 708 may comprise one or more of the measured pathloss, the measured reference signal received power (RSRP) and the measured channel state information (CSI) with respect to time during the in-coverage period 708. In one example, the representation of the channel condition profile for the in-coverage period 708 comprises measurements of pathloss against time. In other examples, the communications device 704 may subtract a free space pathloss from the measured pathloss. As explained above, the measured pathloss is generally comprised of a free space pathloss representing an attenuation of radio signals due to a distance between the communications device 704 and a satellite, and additional pathloss due to obstructions along a communication path between the communications device 704 and the satellite (as shown in FIG. 8 for example). The free space pathloss may be known at both the communications device 704 and a base station. For example, the communications device 704 and the base station may be aware of parameters regarding the satellite's orbit and can infer a distance between the communications device 704 and the satellite 706 at a given time in the satellite's orbit. In such examples, the representation of the channel condition profile may comprise the additional pathloss and not include the free space pathloss. This may lead to a reduction in signaling because fewer bits may be required to transmit an indication of the additional pathloss compared to the measured pathloss (which comprises both the additional pathloss and the free space pathloss) because the additional pathloss has a smaller dynamic range than the measured pathloss.

FIG. 11B is a flow diagram illustrating steps performed by a base station in an NTN (which may be implemented in the satellite 706 or may be on the ground such as base station 332) in accordance with example embodiments.

In step S870, a base station receives the representation of the channel condition profile for the in-coverage period 708. In example embodiments, the base station is implemented in the satellite 706. In example embodiments, the base station is implemented in a terrestrial station (such as base station 332). In such embodiments, the satellite 706 forwards the representation of the channel condition profile for the in-coverage period 708 to the base station.

In step S872, the base station identifies, based on the representation of the channel condition profile for the in-coverage period 708, one or more sub-periods of a subsequent in-coverage period during which a transmission of signals by the communications device or a reception of signals by the communications device transmitted by the base station can provide a relative reduction in an amount of communications resources required to correctly communicate data. In one example, the base station may identify sub-periods within the in-coverage period 708 during which a quality of the channel conditions was highest. For example, the base station may identify the unobstructed time period 742 as a sub-period during which the quality of the channel conditions was highest because the pathloss of the unobstructed time period is lowest. Accordingly, the base station may identify a sub-period in a subsequent in-coverage period which corresponds to the unobstructed time period 742. The sub-period in the subsequent in-coverage period which corresponds to the unobstructed time period 742 may be a time period which starts and ends at a same time as the unobstructed time period 742 relative to an orbit of the satellite 706. For example, the time 0 seconds in FIG. 8 represents the satellite 706 at a given position in its orbit. The sub-period in the subsequent in-coverage period will therefore start when the satellite 706 is in the same position as it was in at 0 seconds in FIG. 8.

In some embodiments, it may be desirable for the communications device 704 to indicate the additional pathloss and not the free space pathloss as explained above. In such embodiments, the base station identifies, based on the additional pathloss with respect to time during the in-coverage period, one or more sub-periods of a subsequent in-coverage period in which the additional pathloss is expected to be lowest. Scheduling based on the signaled additional pathloss rather than the measured pathloss may lead to a reduction in the number of communications devices being scheduled when the satellite 706 is directly overhead the communications device (when the free space pathloss between the communications device and the satellite is the smallest). In other words, scheduling based on the additional pathloss may lead to the times at which the communications devices are scheduled being more evenly distributed over the in-coverage period, and reduces a likelihood that many of the communications devices will be scheduled at times when the satellite is directly overhead (when the free space pathloss is lowest). In one example, with reference to FIGS. 7 and 8, the base station may determine that the unobstructed time period 742 is the sub-period of the subsequent in-coverage period when the additional pathloss is lowest.

In step S874, the base station may determine that it has downlink data to send to the communications device 704. In response to determining that it has downlink data to send, the base station may schedule to transmit radio signals representing the downlink data to the communications device 704 in the identified one or more sub-periods of the subsequent in-coverage period. The base station may then transmit scheduling information identifying the one or more identified sub-periods of the subsequent in-coverage period.

In example embodiments, the base station may determine that a time taken to transmit the downlink data that it has determined to send to the communications device 704 exceeds one of the identified sub-periods of the subsequent in-coverage period. In particular, the base station may determine that a portion of the downlink data cannot be scheduled to the communications device 704 in one of the identified sub-periods. In such embodiments, the base station may transmit the portion of the downlink data which cannot be scheduled to the communications device 704 in one of the identified sub-periods in another of the identified sub-periods.

In example embodiments (not shown in FIGS. 11A and 111B), the communications device 704 may update the channel condition profile for the in-coverage period 708 and transmit a representation of the updated channel condition profile for the in-coverage period 708 to the satellite 706 for one or more subsequent flypasts. This may occur in response to for example a pre-determined time limit expiring or a detection that the communications device 704 has moved from a position in which it measured the channel conditions during the in-coverage period 708.

In example embodiments, the base station may transmit periodic requests to the communications device 704 to report channel conditions. In such embodiments, the base station may configure a channel condition profile based on channel condition reports received from the communications device 704. For example, the periodic requests may specifically be in the form of Channel State Information (CSI) requests. In response to transmitting the periodic requests, the base station may receive the requested channel condition reports from the communications device 704. The base station may then store the requested channel condition reports in a table. The table may represent requested channel condition reports received over time for example. Accordingly, the base station may configure a channel condition profile based on the table. Such embodiments may provide for the base station to obtain the most up-to-date channel condition profile, thereby enabling the base station to more accurately identify sub-periods of subsequent in-coverage periods which improve a likelihood of correctly communicating data. Such embodiments also minimize the amount of specification change and the potential engineering burden of updating a communications device to support channel condition profiles.

Scheduling the Communications Device

In example embodiments, the steps outlined in FIG. 11A may be performed by a plurality of communications devices (such as communications device 704, 1104). In such embodiments, the base station may receive a plurality of representations of channel condition profiles within an in-coverage period from a respective plurality of communications devices 704, 1104. In other words, each of the plurality of communications devices 704, 1104 may transmit, to the base station, a representation of a channel condition profile for an in-coverage period between itself and the satellite 706. The base station may determine that it has downlink data to send to each of the plurality of communications devices 704, 1104 at a time during a subsequent in-coverage period. In this case, it may not be possible for the base station to transmit radio signals representing the downlink data to both of the plurality of communications devices 704, 1104 at the determined time during the subsequent in-coverage period. Accordingly, the base station may determine, based on the received plurality of representations of the channel condition profiles for the in-coverage period for both of the communications device 704, 1104, which of the plurality communications devices 704, 1104 measured a higher quality of channel conditions at the determined time during the subsequent in-coverage period. The base station may then schedule to transmit radio signals representing the downlink data to the communications device which measured the higher quality of radio conditions at the determined time during the subsequent in-coverage period. The other of the plurality of communications devices 704, 1104 may receive radio signals representing the downlink data at a later time during the subsequent in-coverage period.

As an example, with reference to FIGS. 9 and 10, the base station may determine that it has data to send to both the first communications device 704 and to the second communications device 1104 on the other side of the obstacle 702 at a time 2 seconds into a second flypast of the satellite 706. The base station may then determine that the quality of the channel conditions for the first communications device 704 was higher than that for the other second communications device 1104 at time 2 seconds in the first flypast because the measured pathloss for the first communications device 704 was lower than that for the other second communications device 1104 at time 2 seconds in the first flypast. Accordingly, the base station may schedule to transmit radio signals representing the downlink data to the first communications device 704 at time 2 seconds in the second flypast. The other second communications device 1104 may receive radio signals representing the downlink data at a later time.

If the base station instead determined that it had data to send to both the first communications device 704 and to the second communications device 1104 on the other side of the obstacle 702 at a time 8 seconds into a second flypast of the satellite, then the base station may have chosen to schedule to transmit radio signals representing the downlink data to the second communications device 1104 at time 8 seconds in the second flypast. The communications device 704 may receive radio signals representing the downlink data at a later time or in a further subsequent flypast.

In example embodiments, the base station may determine that it has data to send to both communications devices 704, 1104. The base station may identify, based on the received plurality of representations of the channel condition profiles during the in-coverage period for the communications devices 704, 1104, one or more sub-periods during a subsequent in-coverage period for each of the plurality of communications device 704,1104 during which a transmission of signals by the communications devices 704, 1104 can provide a relative reduction in an amount of communications resources required to correctly communicate data carried by the transmitted signals compared with other sub-periods of the subsequent in-coverage period. The base station may then schedule to transmit radio signals representing downlink data to the plurality of communications devices during the identified one or more sub-periods during the subsequent in-coverage period for each of the communications devices 704, 1104. For example, the communications devices 704, 1104 may report the pathloss profiles shown in FIG. 10 to the base station. The base station may determine that it has data in its buffer for both of the communications devices 704, 1104 at time 0 seconds. On the basis of the pathloss profiles, the base station may then decide to defer scheduling the second communications device 1104 until time 7 seconds into a subsequent in-coverage period when its pathloss is expected to improve. Similarly, the base station may schedule the first communications device 704 before time 6 seconds into the subsequent in-coverage period after which the pathloss is expected to deteriorate.

Contents of Channel Condition Profile

In example embodiments, the channel condition profile during the in-coverage period may comprise measurements of a pathloss of the radio signals transmitted between the communications device and the satellite 706 during the in-coverage period with respect to time. The communications device 704 may transmit, based on the measurements of pathloss with respect to time, an indication of a number of suggested repetitions with respect to time.

In example embodiments, the communications devices 704 may identify, based on the channel condition profile during the in-coverage period, a one or more sub periods of a subsequent one of the in-coverage periods during which a transmission of signals by the communications device can provide a relative reduction in an amount of communications resources required to correctly communicate data carried by the transmitted signals compared with other sub-periods of the subsequent in-coverage period. The communications device 704 may transmit an indication of the identified sub-period of the subsequent in coverage period to the base station. In response, the base station may schedule to transmit the radio signals representing the downlink data to the communications device 704 in the identified sub-period of the subsequent in-coverage period. For example, the communications device 704 may determine that pathloss is lowest during the unobstructed time period 742 (which lasts from zero to six seconds of the satellite's orbit as shown in FIG. 8). Accordingly, the communications device 704 identifies the sub-period of the subsequent in-coverage period as the period from zero to six seconds starting from a time in the subsequent in-coverage period at which the satellite 706 is at a same position as it was at zero seconds in the in-coverage period. The communications device 704 then transmits an indication of the identified sub-period of the in-coverage period to the satellite 706. In response, the base station may schedule to transmit radio signals representing the downlink data during the identified sub-period of the subsequent in-coverage period.

Figure 12:
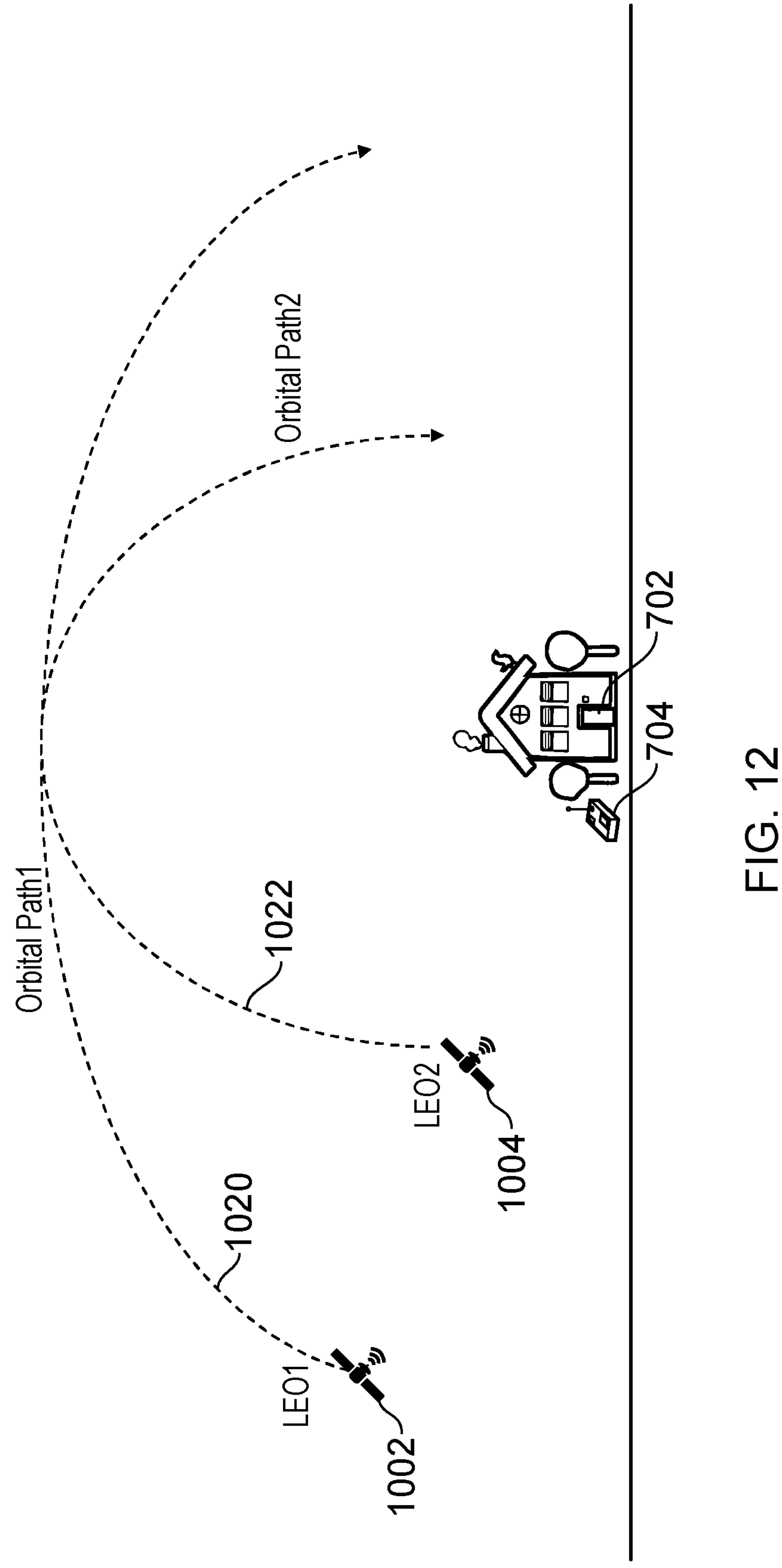
FIG. 12 is a schematic diagram illustrating a plurality of satellites each occupying a respective plurality of orbital paths about the earth in accordance with example embodiments.

In example embodiments, the communications device 704 is configured to communicate with a plurality of satellites which orbit the earth. FIG. 12 is a schematic diagram illustrating a plurality of satellites 1002, 1004 each occupying a respective plurality of orbital paths 1020, 1022 about the earth. In particular, a first 1002 of the plurality of satellites 1002, 1004, occupies a first orbital path 1020 and a second 1004 of the plurality of satellites 1002, 1004, occupies a second orbital path 1022. The first orbital path 1020 and the second orbital path 1022 may be different as shown in FIG. 12. Each of the plurality of satellites 1002, 1004 may have a co-located base station or the base stations may be implemented as terrestrial stations as explained above.

In such embodiments, the communications device 704 is configured to measure channel conditions with respect to time during an in-coverage period between the communications device 704 and the first satellite 1002, and to measure channel conditions with respect to time during an in-coverage period between the communications device 704 and the second satellite 1004. In example embodiments, the in-coverage period for the first satellite 1002 overlaps in time with the in-coverage period for the second satellite 1004. In such embodiments, the communications device 704 is configured to switch between measuring channel conditions for the first satellite 1002 and for the second satellite 1004. The communications device 704 then transmits a representation of a channel condition profile for the first satellite 1002 to a base station of the non-terrestrial network and transmits a representation of a channel condition profile for the second satellite 1004 to the to a base station of the non-terrestrial network.

In example embodiments, the channel condition profiles for the first satellite 1002 and the second satellite 1004 are forwarded to a common point in the network (such as a base station 332 or the core network part 302 for example). The base station may determine that it has downlink data to transmit to the communications device 704 for which there is a potential transmission time period. In other words, the potential transmission time period is a time period, the start of which is the earliest point at which the downlink data may begin to be transmitted and the end of which is the latest point at which the downlink data may begin to be transmitted. The core network part may use the received representations of the channel condition profiles for the first satellite 1002 and the second satellite 1004 to determine which of the first 1002 or second satellites 1004 is serving the communications device 704 during the potential transmission time period. The core network part then identifies, based on the received channel condition profile for the satellite which is serving the communications device 704 during the potential transmission time period, a sub-period of a subsequent in-coverage period during which a transmission of signals by the communications device 704 can provide a relative reduction in an amount of communications resources required to correctly communicate data carried by the transmitted signals compared with other sub-periods of the subsequent in-coverage period. The base station may then transmit the downlink data in the identified sub-period of the subsequent in-coverage period.

In example embodiments, the base station may determine, based on the received channel condition profiles for the first satellite 1002 and the second satellite 1004, to handover the communications device 704 from the first satellite 1002 to the second satellite 1004 or vice versa. This may occur, for example, if in-coverage periods for the first satellite 1002 overlap in time with in-coverage periods for the second satellite 1004 as explained above. In one example, the core network part may determine that it has downlink data to transmit to the communications device 704 at a time during an in-coverage period which overlaps for the first satellite 1002 and the second satellite 1004. The core network part may select one of the first 1002 and second satellites 1004 which it expects to have higher quality channel conditions for the time during the overlapping in-coverage period at which the downlink data is to be transmitted. In one implementation, if the communications device 704 is currently being served by the first satellite 1002 and the base station determines that a quality of the channel conditions for the first satellite 1002 at a time during a previous in-coverage period (corresponding to the time during the in-coverage period at which the downlink data is to be transmitted) is lower than a quality of the channel conditions for the second satellite 1004 at the same time, then the base station may transmit an instruction to the communications device 704 via the first satellite 1002 to handover to the second satellite 1004 in advance of the time during the overlapping in-coverage period at which the downlink data is to be transmitted.

Communications Device Transmitting the Channel Condition Profile

In some embodiments, the communications device 704 may receive radio signals representing downlink data from a base station for which the base station requests acknowledgement information. For example, the base station may schedule the communications device 704 to receive data in a Physical Downlink Shared Channel (PDSCH) for which there is an associated Physical Uplink Control Channel (PUCCH) to transmit Hybrid Automatic Repeat Request (HARQ) acknowledgement (ACK) or negative acknowledgement (NACK) information. In such embodiments, the communications device 704 may include an indication of identified sub-periods of the subsequent in-coverage period during which a transmission of signals by the communications device 704 or to the communications device 704 can provide a relative reduction in an amount of communications resources required to correctly communicate data carried by the transmitted signals compared with other sub-periods of the subsequent in-coverage period in the acknowledgement information which it transmits to the satellite 706. For example, if both communications devices 704, 1104 in FIG. 9 were scheduled to receive radio signals representing downlink data at time 1 second in a subsequent in-coverage period, the first communications device 704 may indicate in the acknowledgement information it transmits to the satellite 706 that it would prefer to receive subsequent downlink data as soon as possible or at least before time 7 seconds into the subsequent in-coverage period. Conversely, the second communications device 1104 may indicate in the acknowledgement information that it transmits to the satellite 706 that it would prefer to receive subsequent downlink data at time 7 seconds or later into the subsequent in-coverage period.

It will be appreciated by one skilled in the art that times indicated in a PUCCH may be a time relative to a time at which the PUCCH is transmitted, a time at which the PDSCH is received or other time reference. Embodiments have been described in which the communications device 704 is stationary and the satellite passes over the communications device 704 by orbiting the earth. However, after the communications device 704 has measured the channel conditions between itself and the satellite 706 with respect to time during the in-coverage period 708, the communications device 704 may subsequently move to a different position. For example, the communications device 704 may be a smartphone of a user for example who carries the smartphone as they walk. As will be appreciated, if the communications device 708 moves then the measured channel conditions between itself and the satellite 706 with respect to time during the in-coverage period 708, may no longer be valid. In other words, the channel condition profile for the in-coverage period 708 is no longer valid. In one example, with reference to FIG. 9, if the first communications device 704 moves to a position occupied by the second communications device 1104 on another side of the obstacle 702, then a pathloss profile of the communications device 704 changes according to FIG. 10.

In example embodiments, the communications device 704 may determine that it has moved from a position in which it measured the channel conditions within the in-coverage period. For example, the communications device 704 may utilize Global Positioning Satellite (GPS) or Global Navigation Satellite System (GNSS) technology for example to determine its position. In other examples, the communications device 704 may utilize motion sensors (for example, a gyroscope, accelerometer, and/or magnetometer) to determine whether the communications device has moved from the position in which it measured the channel conditions within the in-coverage period. In response to determining that it has moved position, the communications device 704 may determine that the measurements of the channel conditions for the in-coverage period are no longer valid. In response, the communications device 704 may transmit an indication to the base station indicating that the representation of the channel condition profile previously transmitted to the base station is no longer valid. The communications device 704 may transmit a representation of an updated channel condition profile corresponding to measurements of the channel conditions between itself and the satellite during a subsequent in-coverage period of the satellite 706.

In some embodiments, as discussed above, the communications device 704 may identify one or more sub-periods of a subsequent one of the in-coverage periods during which a transmission of signals by the communications device can provide a relative reduction in an amount of communications resources required to correctly communicate data carried by the transmitted signals compared with other sub-periods of the subsequent in-coverage period. In such embodiments, the communications device may transmit an indication of the identified sub-periods to the base station. In example embodiments, the communications device 704 may determine whether or not it has moved since it measured the channel conditions between itself and the satellite 706 during the in-coverage period 708, and transmit the indication of the identified one or more sub-periods if the communications device 704 determines that it has not moved. If the communications device 704 determines that it has moved, then it transmits an indication that the channel condition profile for the in-coverage period previously transmitted to the base station is no longer valid. In this case, the base station may schedule radio signals representing downlink data for subsequent transmission to the communications device 704 based on conventional techniques and disregard any previous identified sub-periods which may have been indicated by the communications device 704.

In example embodiments, the communications device 704 may be configured to operate in an active mode or a low powered mode. In the active mode, the communications device 704 is in active communication with the satellite 706. In other words, the communications device 704 is actively transmitting and/or receiving signals via the satellite 706 in the active mode. In the low powered mode, the communications device 704 is not actively transmitting and receiving signals via the satellite 706. In accordance with example embodiments, the communications device 704 may determine to enter the low powered mode to save power. In such embodiments, the communications device 704 may determine not to measure channel conditions between itself and the satellite 706 when the communications device 704 is in the low-powered mode. Instead, the communications device 704 measures channel conditions between itself and the satellite 706 with respect to time only when the communications device 704 is in the active mode. The communications device 704 then transmits a channel condition profile to the base station based on the measurements of the channel conditions in the active mode. The channel condition profile may be transmitted to the base station via the satellite 706 or via another satellite.

Means of Transmitting Channel Condition Profile

In example embodiments, the communications device 704 may transmit a representation of a channel condition profile for measured channel conditions between itself and the satellite 704 during the in-coverage period via Radio Resource Control (RRC) signaling. Such embodiments are particularly advantageous when the quality of the radio signals are not expected to change rapidly.

In example embodiments, the communications device 704 may transmit a representation of a channel condition profile for measured channel conditions between itself and the satellite 704 during the in-coverage period via Channel State Information (CSI). In some embodiments, the communications device 704 may transmit, via CSI, an indication of one or more sub-periods of a subsequent in-coverage period during which a reception of signals by the communications device transmitted by the base station can provide a relative reduction in an amount of communications resources required to correctly communicate data carried by the received signals compared with other sub-periods of the in-coverage period. As such embodiments involve signaling at the physical layer (rather than higher layers such as RRC), then the indication of the one or more sub-periods may be reported more rapidly.

In example embodiments, the communications device 704 may transmit a representation of a channel condition profile for measured channel conditions between itself and the satellite 706 during the in-coverage period as part of an initial access procedure. Such embodiments are particularly advantageous if the communications device 704 is an Internet-of-Things (IoT) device for which signaling exchanges are typically short and there may not be a long-lived connection following the initial access stage. In other words, since the initial access procedure may form the bulk of the communication exchange, it may be desirable for the communications device 704 to transmit the representation of the channel conditions during the initial access procedure. Furthermore, it is possible that channel condition profiles which have been transmitted from the communications device 704 to the base station may be lost at the base station following release of an RRC connection. Accordingly, it may be desirable to inform the base station of the channel condition profile during the initial access stage. The channel condition profile may then be used by the base station during a remaining portion of the initial access procedure or in a subsequent RRC connection.

The representation of the channel condition profile may be transmitted to the base station via the initial access procedure according to one of the following embodiments:

A representation of the channel condition profile may be included in Msg3 of the initial access procedure, which is a PUSCH that conveys an RRC message. Specifically, the indication may be included in a Medium Access Control (header) or RRC message of the PUSCH. Alternatively, a representation of the channel condition profile is transmitted in connection with the Msg3, such as in the form of Early Data Transmission (EDT). In this case, the representation of the channel condition profile is transmitted after the Msg3.

A representation of the channel condition profile may be included in Msg1 of the initial access procedure, which is a Physical Random Access Channel (PRACH) preamble. Different preamble sequences (or time/frequency locations of a PRACH preamble) may indicate different aspects of the channel condition profile. For example, a set of PRACH preamble sequences may be split into two sets. In example embodiments, signaling a PRACH preamble from the first set may indicate that channel conditions are good during an early part of the in-coverage period (for example the quality of the channel conditions are above a pre-defined threshold). Conversely, signaling a PRACH preamble from the second set may indicate that the channel conditions are good during a later part of the in-coverage period.

A representation of the channel condition profile may be included in Msg5 of the initial access procedure which is a PUSCH that indicates RRC connection setup complete. The representation of the channel condition profile may be included as part of an RRC message in the Msg5 or as a MAC Control Element (CE) within the Msg5.

Communications Device Using Channel Condition Profile to Request Resources

Embodiments outlined above specify that the communications device 704 transmits a representation of the channel condition profile between itself and the satellite 706 for the in-coverage period. However, in some embodiments discussed in more detail below, the communications device 704 may determine that it has uplink data to send to the satellite 704. In response, the communications device 704 may request resources from the base station to transmit the uplink data. In one implementation, the communications device 704 may determine one or more sub-periods of a subsequent in-coverage period during which a transmission of signals by the communications device can provide a relative reduction in an amount of communications resources required to correctly communicate data carried by the transmitted signals compared with other sub-periods of the subsequent in-coverage period based on the channel condition profile. The communications device 704 may then transmit the request in a PRACH in the one or more identified sub-periods.

If the communications device 704 is in an idle mode (such as an RRC idle mode as will be appreciated by one skilled in the art), it may transmit the request in the PRACH in order to transmit uplink data. If the PRACH is transmitted as part of an initial access procedure for example, then the transmission of the uplink data may be via initiating an RRC connection, early data transmission (for example the uplink data is transmitted as part of a short-lived RRC connection) or via data transfer over non-access stratum (NAS) signaling (DoNAS) for NB-IoT. In embodiments where the communications device 704 is in the idle mode, the communications device 704 may determine to transmit the request based on the representation of the channel conditions for the in-coverage period immediately prior to the subsequent in-coverage period in which the one or more sub-periods for transmitting the request are identified.

If the communications device 704 is in a connected mode (such as an RRC connected mode as will be appreciated by one skilled in the art), the communications device 704 may transmit PRACH in order to send a scheduling request (SR) or as part of a cell handover procedure. In embodiments where the communications device 704 is in the connected mode, the communications device 704 may determine to transmit the request based on the representation of the channel conditions for any in-coverage period stored at the communications device which is prior to the subsequent in-coverage period in which the one or more sub-periods for transmitting the request are identified.

Figure 13:
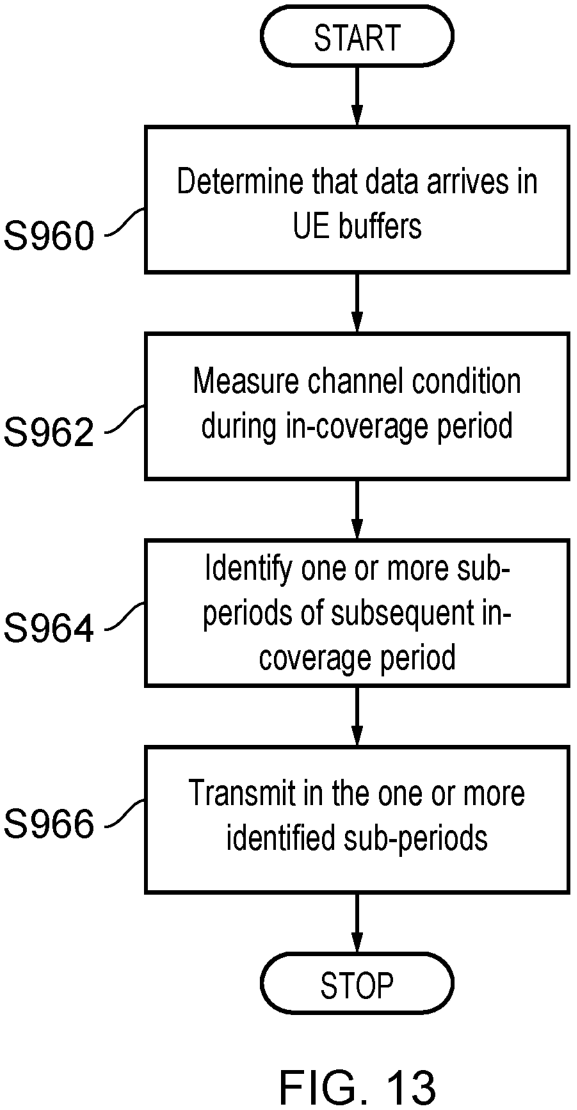
FIG. 13 is a flow diagram illustrating steps performed by a communications device in an NTN in accordance with example embodiments

FIG. 13 is a flow diagram illustrating an example of the communications device determining to transmit the request for uplink data to the satellite.

In step S960, the communications device 704 determines that it has uplink data in its buffer to transmit to the base station via the satellite 706. In step S962, the communications device 704 measures channel conditions between the communications device 704 and the satellite 706 with respect to time during an in-coverage period 708. The communications device 704 may store the measured channel conditions as a channel condition profile. In step S964, the communications device 704 may identify, based on the channel condition profile during the in-coverage period, one or more sub-periods of a subsequent in-coverage period during which a reception of signals by the communications device transmitted by the base station can provide a relative reduction in an amount of communications resources required to correctly communicate data carried by the received signals compared with other sub-periods of the in-coverage period. In step S966, the communications device 704 transmits a request for uplink data during the one or more identified sub-periods of the subsequent in-coverage period.

In some embodiments, before transmitting the request in the one or more identified sub-periods of the subsequent in-coverage period, the communications device 704 may first determine that a trajectory of the satellite 706 during the in-coverage period is similar to a trajectory of the satellite 706 during the subsequent in-coverage period. In such embodiments, the communications device 704 may only transmit the request if it determines that the trajectory of the satellite 706 during the in-coverage period is similar to the trajectory of the satellite 706 in the subsequent coverage period. In some embodiments, the communications device 704 may only transmit the request if it determines that the trajectories are similar within a pre-defined threshold.

Figure 14:
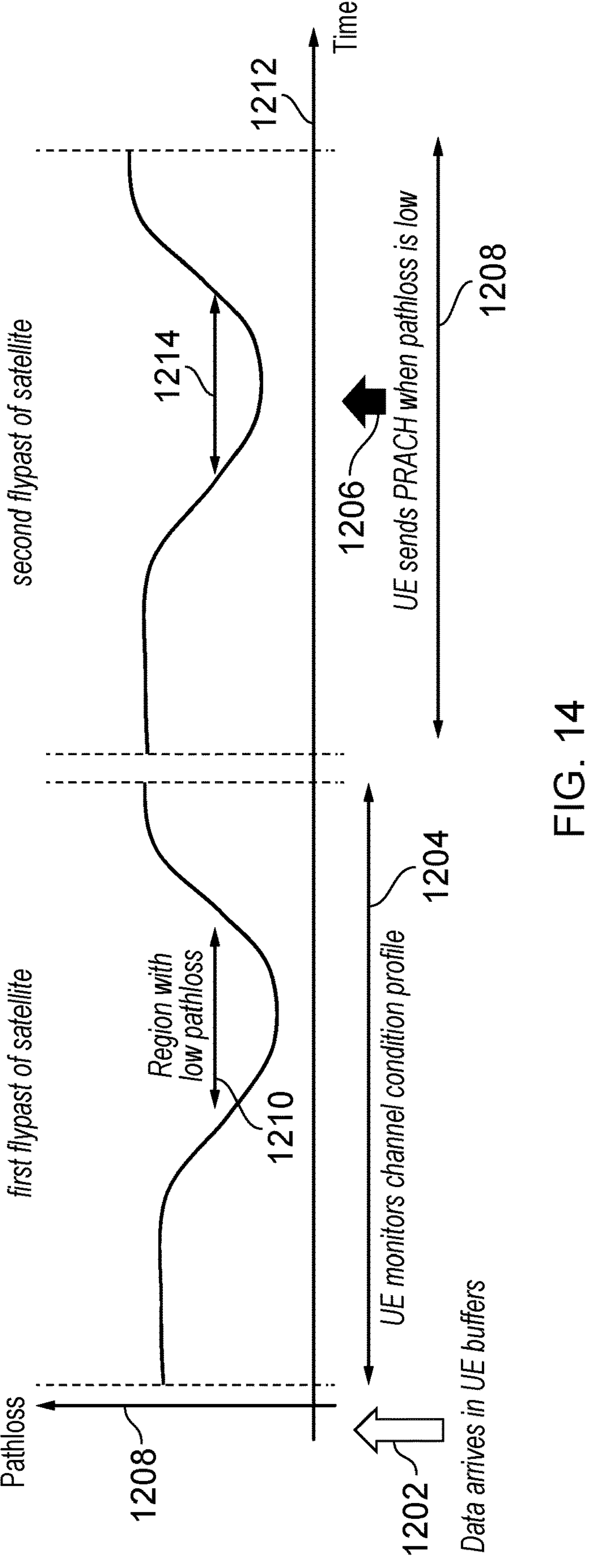
FIG. 14 is a graphical representation of a variation in pathloss with respect to time for transmission of radio signals between a communications device and a satellite during two in-coverage periods in accordance with example embodiments.

FIG. 14 illustrates an example of measurements of pathloss against time for the procedure described in FIG. 13. As shown in FIG. 14 by arrow 1202, the communications device 704 receives uplink data in its buffer to transmit to the base station via the satellite 706. In response, the communications device 704 determines that it has uplink data to transmit to the base station. Subsequently, the communications device 704 measures a pathloss of radio signals transmitted between itself and the satellite 706 with respect to time during an in-coverage period 1204. The communications device 704 then identifies, based on the measurements during the in-coverage period 1204, a sub-period 1210 of the in-coverage period 1204 during which the pathloss is lowest. The communications device 704 then identifies a sub-period 1214 during a subsequent in-coverage period 1208 in which the pathloss is expected to be low. The subsequent in-coverage period 1214 may be an in-coverage period of the satellite 706 or an in-coverage period of another satellite with an identical or similar trajectory. The communications device 704 then transmits, in the identified sub-period 1214 during the subsequent in-coverage period 1206, a request for resources from the base station to transmit uplink data as shown by arrow 1206. In FIG. 14, the request is transmitted in a PRACH.

In example embodiments, the communications device 704 may determine whether it is more efficient to identify the one or more sub-periods during a subsequent in-coverage period in which to send the request or to send the request as soon as the data arrives in the buffer of the communications device 704. For example, if the process of measuring the channel conditions utilizes more energy than transmitting a PRACH at a less favorable time, the communications device 704 may send the PRACH as soon as the data arrives in the buffer of the communications device 704.

In example embodiments, the base station may control when the communications device 704 transmits the request for resources. The base station may transmit criteria to the communications device (for example, in a system information block (SIB)) to be used by the communications device 704 for determining when to transmit the request.

In one example, the criteria may indicate that when the measured pathloss is at least a pre-defined amount lower than the highest pathloss along a trajectory then the communications device 704 should send the request in PRACH.

In another example, the criteria may indicate that when the measured pathloss is within a pre-defined amount of the lowest pathloss along the trajectory then the communications device 704 should send the request in PRACH.

Although embodiments described above have been explained with reference to a PRACH, the embodiments are applicable to the transmission of other uplink channels as will be appreciated. For example, the above embodiments can also be applied to PUSCH or PUCCH.

In example embodiments, the base station may assign more than one PUSCH occasion to the communications device 704 and, in response, the communications device 704 may determine, based on the channel condition profile, which of the PUSCH occasions in which to transmit a PUSCH.

In example embodiments, the base station may assign the communications device 704 with semi-persistent scheduling (SPS) resources for PUSCH or preconfigured uplink resources (PUR) for PUSCH. The communications device 704 may determine, based on the channel condition profile, which PUSCH instance to use to transmit PUSCH. It will be appreciated that SPS or PUR resources are semi-statically assigned in a periodic pattern and the communications device 704 may determine in which of these periodic resources to transmit PUSCH.

In example embodiments, the communications device 704 may propose a PUR resource configuration. For example, the communications device 704 may identify one or more sub-periods of a subsequent in-coverage period in which to transmit PUSCH based on the channel condition profile. The communications device 704 may transmit an indication of the identified one or more sub-periods of the subsequent in-coverage period to the base station and the base station uses the indications to configure PUR for the communications device 704.

Satellite Constellations and Channel Condition Profiles with Respect to Satellite Position As explained with reference to FIG. 12 above, a plurality of satellites 1002, 1004 may orbit the Earth and be visible at various times to the communications device 704. In some embodiments, as explained in more detail below, a plurality of satellites may form a constellation in which the plurality of satellites 1002, 1004 operate together to provide coverage to the communications device 704.

In such embodiments, the communications device 704 may measure channel conditions between itself and each of the satellites in the constellation with respect to time during an in-coverage period of each of the satellites in the constellation.

The communications device 704 may transmit a representation of a channel condition profile for the in-coverage period of each of the satellites in the constellation to each respective satellite of the constellation.

Alternatively, the communications device 704 may configure a master channel condition profile for the constellation by combining the channel condition profiles for each of the satellites in the constellation. The communications device 704 may transmit a representation of the master channel condition profile to the base station.

In example embodiments, the communications device 704 may select a preferred satellite in the constellation from each of the satellites in the constellation. For example, the communications device 704 may select a satellite of the constellation with the best pathloss profile as the preferred satellite. In other words, the communications device 704 may select a satellite of the constellation for which the pathloss is lowest on average. The preferred satellite 704 may be a satellite via which the communications device 704 prefers to transmit and receive data from the base station. The communications device 704 may include an indication of the preferred satellite when transmitting representations of the channel condition profiles for satellites in the constellation or when transmitting the master channel condition profile for the whole constellation.

In example embodiments, the communications device 704 may transmit an indication of one or more identified sub-periods in a subsequent in-coverage period of the preferred satellite during which a transmission of signals by the communications device can provide a relative reduction in an amount of communications resources required to correctly communicate data carried by the transmitted signals compared with other sub-periods of the subsequent in-coverage period.

In example embodiments, the communications device 704 transmits PRACH to the preferred satellite when the preferred satellite traverses the sky in a region of the communications device 704. In other words, the communications device 704 may determine to transmit PRACH to the preferred satellite during an in-coverage period of the preferred satellite.

In such embodiments, the communications device 704 may specifically transmit PRACH during the one or more identified sub-periods of the subsequent in-coverage period during which a transmission of signals by the communications device can provide a relative reduction in an amount of communications resources required to correctly communicate data carried by the transmitted signals compared with other sub-periods of the subsequent in-coverage period.

Embodiments described above have explained measuring channel conditions with respect to time. In some embodiments, the measurements of the channel conditions with respect to time (in other words, the channel condition profile) may be used to configure a map of the sky in which one or more positions in the sky are associated with a channel condition for a given position of the communications device 704. In other words, as the channel conditions provide an indication of how obstructed communications paths are between the communications device 704 and the satellite 706, the communications device 704 may configure a map of the sky in which positions of the sky relative to the communications device 704 are assigned an obstruction level indicating how obstructed communications paths are for signals between the communications device 704 and a satellite 706 in that position of the sky. The communications device 704 may use ephemeris information in the configuration of the map.

Such embodiments may be particularly advantageous for a High Altitude Platform System (HAPS) deployment. While orbital satellites move along predictable orbital trajectories, HAPS platforms (such as a balloon or a solar-powered aircraft) do not move predictably. Therefore, for a HAPS system, it is advantageous to report channel conditions profiles as a function of a position rather than as a function of time since a position of the HAPS platform at a future time is unknown or unpredictable.

In example embodiments, based on the map, the communications device 704 may determine preferred positions of the satellite 706 in the sky which are associated with better channel conditions between the communications device 704 and a satellite 706. The communications device 704 may transmit an indication of the preferred positions of the satellite 706 to the base station. In response, the base station may schedule radio signals representing downlink data to be transmitted to the communications device 704 when the satellite 706 is at the preferred positions.

In example embodiments, based on the map, the communications device 704 may enter a low power mode (for example, the communications device 704 may enter a sleep mode) when it detects that it is in a coverage area of satellites which occupy positions in which the pathloss is above a pre-defined threshold.

The communications device 704 may report to the base station an indication of the positions of the satellite 706 in the sky which have a pathloss above a pre-defined threshold that would therefore cause the communications device 704 to enter a low power mode. Alternatively, the communications device 704 may transmit the map to the base station and the base station determines, based on the map, the positions which would cause the communications device 704 to enter the low power mode.

In example embodiments, the communications device 704 may determine, based on the map, a position of a satellite at which the communications device 704 intends to transmit PRACH to the satellite, and may transmit the PRACH to the satellite when the satellite reaches the determined position. The position may be chosen because it is associated with a pathloss below a pre-defined threshold for example.

Embodiments described above have explained measuring channel conditions with respect to time and using the measurements to configure a map of the sky in which one or more positions in the sky are associated with channel conditions for a given position of the communications device 704. In other embodiments, the communications device 704 may transmit representations of channel conditions profiles with respect to absolute time during the in-coverage period. The base station may determine, based on known information regarding a location of the satellite as a function of absolute time and the received representations of the channel profiles with respect to absolute time, channel conditions associated with positions of the satellite in the sky. In other words, the base station configures a map of the sky as described above. In some embodiments, the base station may measure the channel conditions and use the information regarding the location of the satellite as a function of absolute time to configure the map of the sky.

Figure 15:
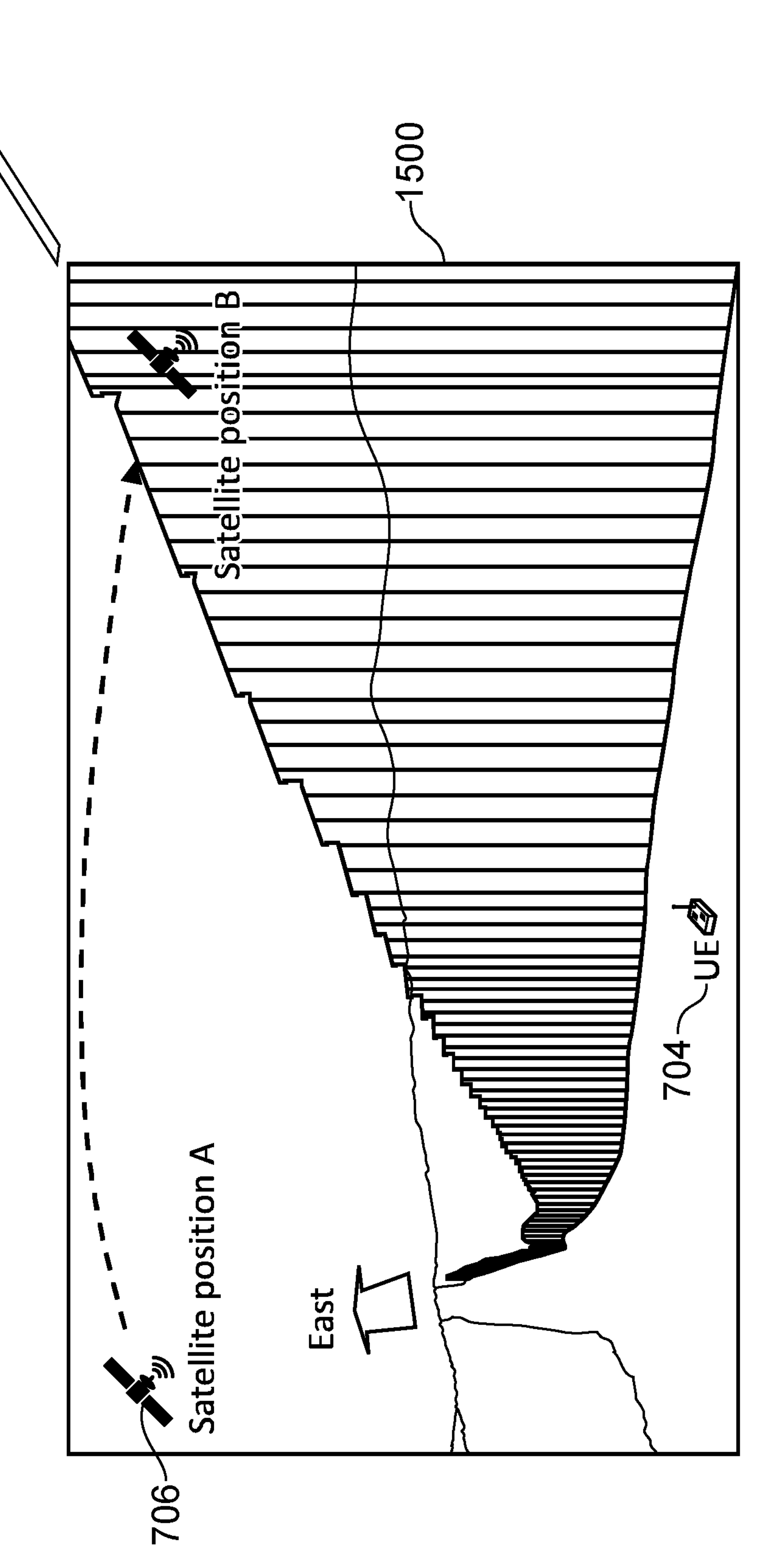
FIG. 15 is a photographic representation of a satellite and a communications device in accordance with example embodiments.

An example of using a map of a sky in an NTN is described with reference to FIG. 15. In FIG. 15, the communications device 704 is located just north of a base of a high east-west wall 1500. When the communications device 704 is in this location, the pathloss may be high when the satellite 706 is south of the east-west wall 1500 because communications paths between the communications device 704 and the satellite 706 are obstructed by the high east-west wall 1500. Conversely, the pathloss may be low when the satellite 706 is north of the east-west wall 1500 because communications paths between the communications device 704 and the satellite 706 are unobstructed. The communications device 704 may report to a base station that the pathloss is low when the satellite 706 is to the north of an east-west line defined by the east-west wall 1500, and that the pathloss is high when the satellite 706 is south of the east-west line defined by the east-west wall 1500. The base station may therefore decide to schedule the communications device 704 to receive radio signals representing downlink data when the satellite 706 is north of the east-west line defined by the east-west wall 1500. The base station may determine that the communications device 704 is to the north of the east-west line defined by the east-west wall 1500 based on location information (such as GNSS information) received from the communications device 704.

In embodiments in which the satellite is represented by a HAPS platform, the communications device 704 may take into account a velocity of the HAPS platform when deciding when to send PRACH since the HAPS platform may move unpredictably as discussed briefly above. References to "velocity" should be taken to encompass both a speed and a direction.

In one example, with reference to FIG. 15, if the HAPS platform were close to the high east-west wall 1500 and moving quickly in a southerly direction, the communications device 704 may determine not to transmit PRACH because it could not completely transmit the PRACH before the pathloss becomes poor due to the obstruction provided by the east-west wall 1500. However, if the HAPS platform were close to the high east-west wall 1500 and moving in a northerly direction, the communications device 704 may determine to transmit the PRACH.

Channel Characteristics

In accordance with example embodiments, the communications device 704 may configure parameters relating to its transmissions and receptions based on the channel condition profile.

In one example embodiment, the communications device may configure its Machine-Type Communication (MTC) Physical Downlink Control Channel (MPDCCH) or NB-IoT PDCCH (NPDCCH) according to the channel condition profile. It will be appreciated that an MPDCCH/NPDCCH search space is a search space formed from a set of candidates of MPDCCH/NPDCCH resources and parameters (for example, a number of repetitions of MPDCCH/NPDCCH and aggregation levels for MPDCCH/NPDCCH). The communications device 704 may configure its MPDCCH/NPDCCH search space as the satellite traverses the sky. For example, with reference to FIG. 8, the communications device 704 may use an MPDCCH/NPDCCH search space with candidates having fewer repetitions during the unobstructed time period 742 when the pathloss is low, and use an MPDCCH/NPDCCH search space with candidates having more repetitions during the obstructed time period 744 when the pathloss is high.

In other example embodiments, the communications device 740 may configure a characteristic of transmission in accordance with the channel condition profile. For example, when the measured pathloss is greater, the communications device 704 may apply more demodulation reference signals (DMRS). Using a greater number of DMRS improves channel estimation performance in poor channel conditions. When the pathloss is greater, the communications device 704 may change parameters controlling cross-subframe channel estimation to allow cross-subframe channel estimation across more subframes. For example, individual redundancy versions in a HARQ transmission may be repeated back-to-back with identical DMRS sequences for a greater number of subframes, allowing for symbol-combining of the transmissions and hence better channel estimation performance.

In the embodiments described above, where the communications device 704 configures parameters relating to its transmissions and receptions based on the channel condition profile, criteria for changing the parameters may be known by both the communications device 704 and the base station.

For example, if the communications device 704 and the base station are aware of the channel condition profile then there may be known triggers for changing parameters. For example, candidates in an MPDCCH search space may include smaller number of repetitions if the pathloss is below a pre-defined threshold and a higher number of repetitions if the pathloss is above the pre-defined threshold.

Indication of Deteriorating Channel Conditions

In example embodiments, the communications device 704 may transmit an indication to the satellite 706 that it expects the channel conditions to deteriorate during particular sub-periods of subsequent in-coverage periods.

For example, if the communications device 704 is receiving PDSCH, the communications device 704 may transmit a PUCCH before the satellite 706 enters a region in the sky at which the communications device 704 expects the channel conditions to deteriorate. For example, the communications device 704 may be scheduled or allocated with multiple potential times at which to transmit the PUCCH. In this embodiment, the communications device 704 selects to transmit the PUCCH at a time before the point at which it expects the channel conditions to deteriorate. Such embodiments recognize that it may be preferable to send a PUCCH before the conditions deteriorate (which may inform the base station that the quality of radio signals will deteriorate at the future point) over sending additional repetitions of the PDSCH.

In example embodiments, the communications device 704 may determine that the satellite 706 is about to enter a region of the sky in which the pathloss is above a pre-defined threshold. In such embodiments, the communications device may transmit a signal to the base station informing the base station that the communications device 704 intends to handover to a different satellite in advance. For example, with reference to FIG. 15, if the satellite 706 is travelling from north of the east-west wall 1500 to the south of the east-west wall, the communications device 704 may signal to the base station that it will handover to the next satellite north of an east-west line, defined by the east-west wall 1500. In other words, the communications device 704 may be configured to trigger a handover or transmit a handover request based on a trajectory of the satellite. Such embodiments are particularly advantageous over conventional handover techniques which rely on measuring RSRP. This is because an RSRP report is only transmitted after the channel conditions fall below a pre-defined threshold. After this, additional time is required to transmit the RSRP report via numerous repetitions and to process the RSRP report at the base station, meaning that the communications device remains under the coverage of the satellite for a time when the channel conditions are poor.

In example embodiments, if there are a plurality of satellites for which the communications device 704 is in a coverage area, the communications device 704 may handover to one of the plurality of satellites. The communications device 704 may transmit an indication to the base station of a preferred satellite of the plurality of satellites to which the communications device 704 would prefer to connect.

Figure 16:
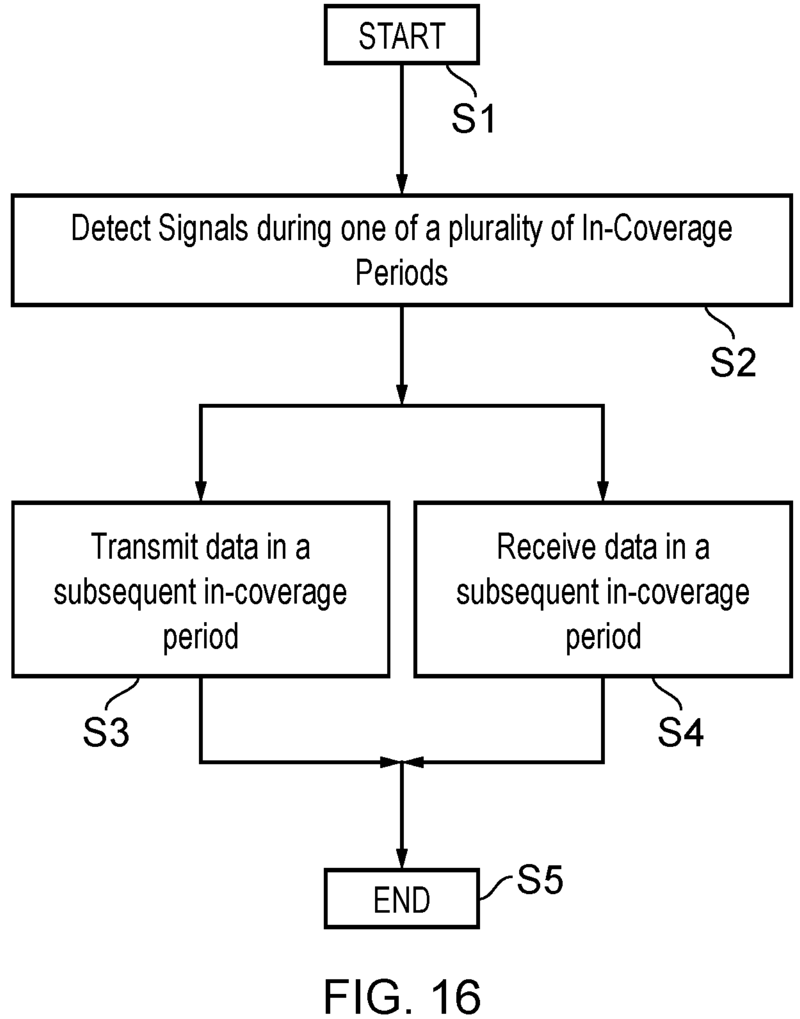
FIG. 16 is a flow diagram illustrating a process performed by a communications device according to example embodiments.

FIG. 16 shows a flow diagram illustrating an example a process performed by a communications in accordance with embodiments. The process shown by FIG. 16 is a method of operating a communications device configured to transmit signals to and/or to receive signals from a wireless communications network which includes non-terrestrial network, NTN, infrastructure equipment (e.g. transmitting signals to or receiving signals from a non-terrestrial network, NTN, infrastructure equipment of the wireless communications network).

The method begins in step S1. In step S2, the communications device detects signals from the non-terrestrial infrastructure equipment during one of a plurality of in-coverage periods during which the communications device is in a coverage area of the NTN infrastructure equipment because the communications device can receive signals transmitted either from the NTN infrastructure equipment carried by an aerial vehicle or relayed from the NTN infrastructure equipment via the aerial vehicle as the aerial vehicle passes over the communications device. In embodiments where the NTN infrastructure equipment is carried by the aerial vehicle, communications circuitry in the aerial vehicle (such as communications circuitry 334) may be an example of the NTN infrastructure equipment. In such embodiments, the communications circuitry of the aerial vehicle performs functions of a base station as described in FIG. 6. In embodiments where the NTN infrastructure equipment is not carried by the aerial vehicle, the NTN infrastructure equipment may be a ground-based station (such as base station 332). In such embodiments, the communications circuitry of the aerial vehicle may operate in a transparent manner as described in FIG. 5.

After step S2, the method proceeds to either step S3 or step S4. Both of Steps S3 and step S4 are performed based on a determined profile of channel conditions with respect to time within the in-coverage period in which the signals from the NTN infrastructure equipment have been detected.

In step S3, the communications device transmits signals carrying data in one or more sub-periods of a subsequent one of the in-coverage periods during which a transmission of signals by the communications device can provide a relative reduction in an amount of communications resources required to correctly communicate data carried by the transmitted signals compared with other sub-periods of the subsequent in-coverage period.

In step S4, the communications device receives signals carrying data in one or more sub-periods of a subsequent one of the in-coverage periods during which a reception of signals by the communications device transmitted by the NTN infrastructure equipment can provide a relative reduction in an amount of communications resources required to correctly communicate data carried by the received signals compared with other sub-periods of the in-coverage period. After step S3 or S4, the method ends at step S5.

Figure 17:
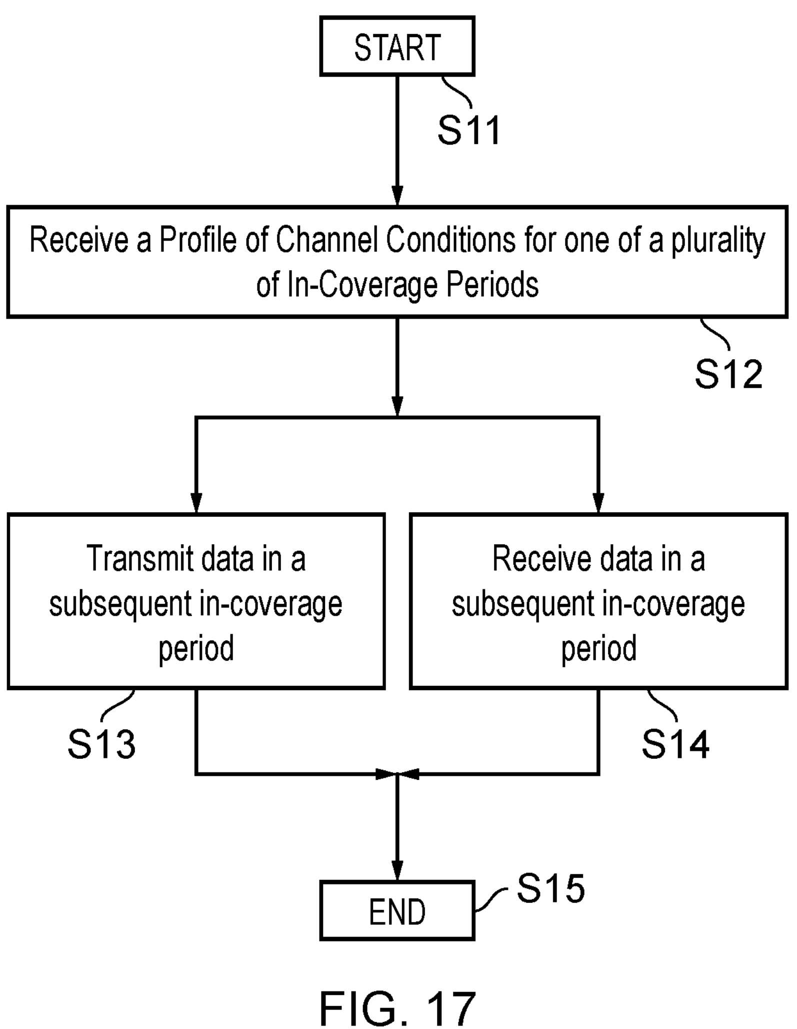
FIG. 17 is a flow diagram illustrating a process performed by a non-terrestrial network, NTN, infrastructure equipment, according to example embodiments.

FIG. 17 shows a flow diagram illustrating an example a process performed by a non-terrestrial network, NTN, infrastructure equipment in accordance with embodiments. The process shown by FIG. 17 is a method of operating an NTN infrastructure equipment configured to transmit signals to and/or to receive signals from one or more communications devices in a wireless communications network.

The method begins in step S11. In step S12, the NTN infrastructure equipment receives, from a communications device, a profile of channel conditions with respect to time within one of a plurality of in-coverage periods in which the signals from a non-terrestrial network, NTN, infrastructure equipment have been detected by the communications device during which the communications device is in a coverage area of the NTN infrastructure equipment because the communications device can receive signals transmitted either from the NTN infrastructure equipment carried by an aerial vehicle or relayed from the NTN infrastructure equipment via the aerial vehicle as the aerial vehicle passes over the communications device. In embodiments where the NTN infrastructure equipment is carried by the aerial vehicle, communications circuitry in the aerial vehicle (such as communications circuitry 334) may be an example of the NTN infrastructure equipment. In such embodiments, the communications circuitry of the aerial vehicle performs functions of a base station as described in FIG. 6. In embodiments where the NTN infrastructure equipment is not carried by the aerial vehicle, the NTN infrastructure equipment may be a ground-based station (such as base station 332). In such embodiments, the communications circuitry of the aerial vehicle may operate in a transparent manner as described in FIG. 5.

After step S12, the method proceeds to either step S13 or step S14. Both of Steps S13 and step S14 are performed based on the received profile of channel conditions with respect to time within the in-coverage period in which the signals from the NTN infrastructure equipment have been detected.

In step S13, the NTN infrastructure equipment transmits signals carrying data in one or more sub-periods of a subsequent one of the in-coverage periods during which a reception of signals by the communications device can provide a relative reduction in an amount of communications resources required to correctly communicate data carried by the transmitted signals compared with other sub-periods of the subsequent in-coverage period In step S14, the NTN infrastructure equipment receives signals carrying data in one or more sub-periods of a subsequent one of the in-coverage periods during which a transmission of signals by the communications device transmitted by the NTN infrastructure equipment can provide a relative reduction in an amount of communications resources required to correctly communicate data carried by the received signals compared with other sub-periods of the in-coverage period. After step S13 or S14, the method ends at step S15.

Those skilled in the art would appreciate that the method shown by FIG. 16 or FIG. 17 may be adapted in accordance with embodiments of the present technique. For example, other intermediate steps may be included in either or both of these methods, or the steps may be performed in any logical order. Though embodiments of the present technique have been described largely by way of the example communications system shown in FIGS. 4 to 6, and described by way of the arrangements shown by FIGS. 7 to 15, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device to transmit or to receive via a non-terrestrial network, NTN, infrastructure equipment, the method comprising:

detecting, by transceiver circuitry of the communications device, signals from the non-terrestrial infrastructure equipment during one of a plurality of in-coverage periods during which the communications device is in a coverage area of the NTN infrastructure equipment because the communications device can receive signals transmitted either from the NTN infrastructure equipment carried by an aerial vehicle or relayed from the NTN infrastructure equipment via the aerial vehicle as the aerial vehicle passes over the communications device, based on a determined profile of channel conditions with respect to time within the in-coverage period in which the signals from the NTN infrastructure equipment have been detected either transmitting signals carrying data in one or more sub-periods of a subsequent one of the in-coverage periods during which a transmission of signals by the communications device can provide a relative reduction in an amount of communications resources required to correctly communicate data carried by the transmitted signals compared with other sub-periods of the subsequent in-coverage period, or receiving signals carrying data in one or more sub-periods of a subsequent one of the in-coverage periods during which a reception of signals by the communications device transmitted by the NTN infrastructure equipment can provide a relative reduction in an amount of communications resources required to correctly communicate data carried by the received signals compared with other sub-periods of the in-coverage period.

Paragraph 2. A method according to paragraph 1, comprising determining, from the detected signals, the profile of channel conditions with respect to time within the in-coverage period in which the signals from the NTN infrastructure equipment have been detected by the communications device, transmitting a representation of the determined profile of the channel conditions with respect to time within the in-coverage period, and receiving from the NTN infrastructure equipment, scheduling information identifying the one or more sub-periods of the subsequent one of the in-coverage periods during which a transmission of signals by the communications device or a reception of signals by the communications device transmitted by the NTN infrastructure equipment can provide a relative reduction in an amount of communications resources required to correctly communicate data.

Paragraph 3. A method according to paragraph 2, wherein the representation of the determined profile of the channel conditions with respect to time within the in-coverage period is derived from an estimation of a reference signal received power, RSRP, a measured pathloss of the detected signal or a representation of channel state information.

Paragraph 4. A method according to paragraph 2, wherein the representation of the determined profile of the channel conditions with respect to time within the in-coverage period is determined by estimating a free space pathloss throughout the in-coverage period, calculating a pathloss of the detected signals between the NTN infrastructure equipment and the communications device which includes the free space pathloss and an additional pathloss, and determining the profile of the channel conditions with respect to time within the in-coverage period by subtracting the estimated free space loss from the calculated pathloss.

Paragraph 5. A method according to paragraph 2, 3 or 4, comprising determining, from the detected signals, an identifier of the aerial vehicle carrying the NTN infrastructure equipment, and transmitting the identifier to the wireless communications network via the NTN infrastructure equipment, whereby the wireless communications network can schedule transmission or reception of data using the NTN infrastructure equipment carried by the aerial vehicle and one or more other NTN infrastructure equipment carried by one or more other aerial vehicles.

Paragraph 6. A method according to paragraph 5, wherein the identifier of the aerial vehicle carrying the infrastructure equipment is an identity of a cell that is transmitted via the aerial vehicle.

Paragraph 7. A method according to paragraph 1, comprising determining, from the detected signals, the profile of channel conditions with respect to time within the in-coverage period in which the signals from the NTN infrastructure equipment have been detected by the communications device, from the determined profile of the channel conditions with respect to time within the in-coverage period, determining at least one sub-period of the subsequent one of the in-coverage periods during which a transmission of signals by the communications device or a reception of signals by the communications device transmitted by the NTN infrastructure equipment can provide a relative reduction in an amount of communications resources required to correctly communicate data transmitting an indication of the determined at least one sub-period of the subsequent one of the in-coverage periods to the wireless communications network in which the wireless communications network can schedule a transmission or reception of the data, and receiving from the NTN infrastructure equipment, scheduling information identifying time and frequency resources from the one or more sub-periods based on the indicated at least one sub-period of the subsequent one of the in-coverage periods during which a transmission of signals by the communications device or a reception of signals by the communications device transmitted by the NTN infrastructure equipment can provide a relative reduction in an amount of communications resources required to correctly communicate data.

Paragraph 8. A method according to paragraph 7, comprising determining, from the detected signals, an identifier of the aerial vehicle carrying the NTN infrastructure equipment, and transmitting the identifier to the wireless communications network via the NTN infrastructure equipment, whereby the wireless communications network can schedule transmission or reception of data using the NTN infrastructure equipment carried by the aerial vehicle and one or more other NTN infrastructure equipment carried by one or more other aerial vehicles.

Paragraph 9. A method according to paragraph 7 or 8, wherein the representation of the determined profile of the channel conditions with respect to time within the in-coverage period is determined by estimating a free space pathloss throughout the in-coverage period, calculating a pathloss of the detected signals between the NTN infrastructure equipment and the communications device which includes the free space pathloss and an additional pathloss, and determining the profile of the channel conditions with respect to time within the in-coverage period by subtracting the estimated free space loss from the calculated pathloss.

Paragraph 10. A method according to paragraph 2 or 7, comprising determining one or more of the sub-periods in which the communications device would prefer to transmit or to receive signals, receiving signals representing downlink data from the NTN infrastructure equipment for which an acknowledgement signal is requested, and transmitting an indication of the preferred one or more sub-periods to the NTN infrastructure equipment with the requested acknowledgement signal.

Paragraph 11. A method according to paragraph 2 or 7, wherein the transmitting the representation of the determined profile of the channel conditions with respect to time within the in-coverage period comprises determining that the communications device has not moved since detecting the signals from the NTN infrastructure equipment during one of the plurality of in-coverage periods, and in response, transmitting the representation of the determined profile with respect to time within the in-coverage period.

Paragraph 12. A method according to paragraph 2 or 7, comprising determining whether the communications device has moved since receiving the scheduling information, and if the communications device has moved, transmitting an indication to the wireless communications network indicating that the profile of channel conditions with respect to time within the in-coverage period is no longer valid.

Paragraph 13. A method according to paragraph 2 or 7, wherein the transmitting the representation of the determined profile of the channel conditions with respect to time within the in-coverage period comprises transmitting the representation of the determined profile of the channel conditions with respect to time within the in-coverage period in a Radio Resource Control (RRC) signal, Channel State Information (CSI) signal or as part of an initial access procedure to a base station.

Paragraph 14. A method according to paragraph 1, comprising determining, from the detected signals, the profile of channel conditions with respect to time within the in-coverage period in which the signals from the NTN infrastructure equipment have been detected by the communications device, and based on the determined profile of channel conditions with respect to time within the in-coverage period in which the signals from the NTN infrastructure equipment have been detected, transmitting a physical random access preamble in one or more sub-periods of a subsequent one of the in-coverage periods to the NTN infrastructure equipment.

Paragraph 15. A method according to paragraph 1, wherein the detecting, by transceiver circuitry of the communications device, the signals from the non-terrestrial infrastructure equipment comprises detecting signals from the NTN infrastructure equipment during one of a plurality of in-coverage periods during which the communications device is in the coverage area of the NTN infrastructure equipment and can receive signals from the NTN infrastructure equipment as the NTN infrastructure equipment carried by the aerial vehicle passes over the communications device, detecting signals from one or more other NTN infrastructure equipment during one of a plurality of in-coverage periods for each of the one or more other NTN infrastructure equipment during which the communications device in a coverage area of the one or more other NTN infrastructure equipment and can receive signals from the one or more other NTN infrastructure equipment as the one or more other NTN infrastructure equipment carried by one or more other aerial vehicles pass over the communications device, based on the determined profile of channel conditions with respect to time within the in-coverage period in which the signals from the NTN infrastructure equipment have been detected and one or more other determined profiles of channel conditions with respect to time within the in-coverage period in which signals from the one or more other NTN infrastructure equipment have been detected, selecting to transmit or receive signals carrying data via the NTN infrastructure equipment which can provide a relative reduction in an amount of communications resources required to correctly communicate data carried by the signals compared with the one or more other NTN infrastructure equipment.

Paragraph 16. A method according to paragraph 1, comprising configuring, based on the determined profile of the channel conditions with respect to time within the in-coverage period in which the signals from the NTN infrastructure equipment have been detected, a profile of the channel conditions with respect to positions of the aerial vehicle relative to the communications device during the in-coverage period, and the transmitting signals carrying data in one or more sub-periods of a subsequent one of the in-coverage periods during which a transmission of signals by the communications device can provide a relative reduction in an amount of communications resources required to correctly communicate data carried by the transmitted signals compared with other sub-periods of the subsequent in-coverage period comprises determining, based on the profile of the channel conditions with respect to positions of the aerial vehicle relative to the communications device during the in-coverage period, positions of the aerial vehicle relative to the communications device during the one or more sub-periods during which a transmission of signals by the communications device can provide a relative reduction in an amount of communications resources required to correctly communicate data carried by the transmitted signals compared with other sub-periods of the subsequent in-coverage period and transmitting the signals carrying data when the aerial vehicle occupies the determined positions, and receiving signals carrying data in one or more sub-periods of a subsequent one of the in-coverage periods during which a reception of signals by the communications device transmitted by the NTN infrastructure equipment can provide a relative reduction in an amount of communications resources required to correctly communicate data carried by the received signals compared with other sub-periods of the in-coverage period comprises determining, based on the profile of the channel conditions with respect to positions of the aerial vehicle relative to the communications device during the in-coverage period, positions of the aerial vehicle relative to the communications device during the one or more sub-periods during which a reception of signals by the communications device transmitted by the NTN infrastructure equipment can provide a relative reduction in an amount of communications resources required to correctly communicate data carried by the received signals compared with other sub-periods of the in-coverage period and receiving the signals carrying data when the aerial vehicle occupies the determined positions.

Paragraph 17. A method according to paragraph 1 comprising, based on a determined profile of channel conditions with respect to time within the in-coverage period in which the signals from the NTN infrastructure equipment have been detected, identifying one or more sub-periods of a subsequent in-coverage period during which transmission or reception of signals by the communications device can provide a relative increase in a likelihood of correctly communicating data by the transmitted or received signals compared with other sub-periods of the subsequent in-coverage period configuring a Machine-Type Communication (MTC) Physical Downlink Control Channel (MPDCCH) or NB-IoT PDCCH (NPDCCH) search space formed from a set of candidates of MPDCCH/NPDCCH resources and parameters as a function of the determined profile of channel conditions with respect to time by using candidates having a lower number of repetitions in the identified one or more sub-periods compared with the other sub-periods of the in-coverage period.

Paragraph 18. A method according to paragraph 1 comprising, based on a determined profile of channel conditions with respect to time within the in-coverage period in which the signals from the NTN infrastructure equipment have been detected, identifying one or more sub-periods of a subsequent in-coverage period during which transmission or reception of signals by the communications device can provide a relative reduction in an amount of communications resources required to correctly communicate data by the transmitted or received signals compared with other sub-periods of the subsequent in-coverage period using fewer demodulation reference signals (DMRS) in the identified one or more sub-periods compared with the other sub-periods of the in-coverage period.

Paragraph 19. A method according to paragraph 1, comprising based on a determined profile of channel conditions with respect to time within the in-coverage period in which the signals from the NTN infrastructure equipment have been detected, identifying one or more sub-periods of a subsequent in-coverage period during which transmission or reception of signals by the communications device can provide a relative increase in an amount of communications resources required to correctly communicate data by the transmitted or received signals compared with other sub-periods of the subsequent in-coverage period, and determining that the communications device has uplink data to transmit to the NTN infrastructure equipment, and transmitting a signal representing the uplink data to the NTN infrastructure equipment in advance of the identified one or more sub-periods commencing.

Paragraph 20. A method according to paragraph 19, wherein the transmitting the signal representing the uplink data to the NTN infrastructure equipment in advance of the identified one or more sub-periods commencing comprises receiving, by the communications device, signals carrying data from the NTN infrastructure equipment in a Physical Downlink Shared Channel (PDSCH), and interrupting the reception of the signals carrying the data from the NTN infrastructure equipment in the PDSCH to transmit, in a Physical Uplink Control Channel (PUCCH), the signal representing the uplink data in advance of the identified one or more sub-periods commencing.

Paragraph 21. A method according to paragraph 19 or 20, wherein the determining that the communications device has uplink data to transmit to the NTN infrastructure equipment comprises determining that the communications device should handover from the NTN infrastructure equipment to another NTN infrastructure equipment; and the transmitting the signal representing the uplink data comprises transmitting an instruction to handover the communications device to the other NTN infrastructure equipment in advance of the one or more identified sub-periods commencing.

Paragraph 22. A method according to any of paragraphs 1 to 21, wherein the aerial vehicle is a Low Earth Orbit (LEO) satellite.

Paragraph 23 A method of operating a non-terrestrial network, NTN, infrastructure equipment of a wireless communications network for transmitting to or receiving from one or more communications devices, the method comprising:

receiving, by the NTN infrastructure equipment from a communications device, a profile of channel conditions with respect to time within one of a plurality of in-coverage periods in which the signals from the NTN infrastructure equipment have been detected by the communications device during which the communications device is in a coverage area of the NTN infrastructure equipment because the communications device can receive signals transmitted either from the NTN infrastructure equipment carried by an aerial vehicle or relayed from the NTN infrastructure equipment via the aerial vehicle as the aerial vehicle passes over the communications device, based on the received profile of channel conditions with respect to time within the in-coverage period in which the signals from the NTN infrastructure equipment have been detected either transmitting signals carrying data in one or more sub-periods of a subsequent one of the in-coverage periods during which a reception of signals by the communications device can provide a relative reduction in an amount of communications resources required to correctly communicate data carried by the transmitted signals compared with other sub-periods of the subsequent in-coverage period, or receiving signals carrying data in one or more sub-periods of a subsequent one of the in-coverage periods during which a transmission of signals by the communications device transmitted by the NTN infrastructure equipment can provide a relative reduction in an amount of communications resources required to correctly communicate data carried by the received signals compared with other sub-periods of the in-coverage period.

Paragraph 24. A method according to Paragraph 23, comprising:

receiving, by the NTN infrastructure equipment from a second communications device, a second profile of channel conditions with respect to time within one of the plurality of in-coverage periods in which the signals from the NTN infrastructure equipment have been detected by the second communications device during which the second communications device is in the coverage area of the NTN infrastructure equipment, determining that the NTN infrastructure equipment has downlink data to send to the second communications device and the communications device, which is a first communications device, via the NTN infrastructure equipment, and based on the received second profile of channel conditions with respect to time within the in-coverage period in which the signals from the NTN infrastructure equipment have been detected and the received profile of channel conditions from the first communications device, determining which of the first or second communications device to transmit the downlink data to at a given time.

Paragraph 25. A method according to paragraph 23, 24 or 25, comprising receiving a representation of a determined profile of the channel conditions with respect to time within the in-coverage period in which the signals from the NTN infrastructure equipment have been detected by the communications device, identifying, based on the received representation of the channel conditions, the one or more sub-periods of the subsequent one of the in-coverage periods during which a transmission of signals by the communications device or a reception of signals by the communications device transmitted by the NTN infrastructure equipment can provide a relative reduction in an amount of communications resources required to correctly communicate data, and transmitting, from the NTN infrastructure equipment, scheduling information identifying the one or more sub-periods of the subsequent one of the in-coverage periods during which a transmission of signals by the communications device or a reception of signals by the communications device transmitted by the NTN infrastructure equipment can provide a relative reduction in an amount of communications resources required to correctly communicate data.

Paragraph 26. A method according to paragraph 23, 24 or 25 wherein the representation of the determined profile of the channel conditions with respect to time within the in-coverage period is derived from an estimation of a reference signal received power, RSRP, a measured pathloss of the detected signal or a representation of channel state information.

Paragraph 27. A method according to paragraph 23, 24 or 25, comprising receiving an indication of a determined at least one sub-period of the subsequent one of the in-coverage periods in which the NTN infrastructure equipment can schedule a transmission or reception of the data, and transmitting, to the communications device, scheduling information identifying time and frequency resources from the one or more sub-periods based on the indicated at least one sub period of the subsequent one of the in-coverage periods during which a transmission of signals by the communications device or a reception of signals by the communications device transmitted by the NTN infrastructure equipment can provide a relative reduction in an amount of communications resources required to correctly communicate data.

Paragraph 28. A method according to paragraph 27, comprising scheduling transmission or reception of data by the communications device in response to receiving the representation of the identified one or more sub-periods of the subsequent one of the in-coverage periods during which a transmission of signals by the communications device or a reception of signals by the communications device transmitted by the NTN infrastructure equipment can provide a relative reduction in an amount of communications resources required to correctly communicate data.

Paragraph 29. A method according to paragraph 25 or 27, comprising transmitting signals representing downlink data to the communications device for which an acknowledgement signal is requested, and receiving an indication of the preferred one or more sub-periods from the communications device with the requested acknowledgement signal.

Paragraph 30. A method according to paragraph 25 or 27, comprising receiving an indication that the received determined profile of the channel conditions is no longer valid because the communications device has moved since receiving the scheduling information.

Paragraph 31. A method according to paragraph 25 or 27, wherein the transmitting the representation of the determined profile of the channel conditions with respect to time within the in-coverage period comprises receiving the representation of the determined profile of the channel conditions with respect to time within the in-coverage period in a Radio Resource Control (RRC) signal, Channel State Information (CSI) signal or as part of an initial access procedure to a base station.

Paragraph 32. A method according to paragraph 27, comprising receiving a physical random access preamble in one or more sub-periods of a subsequent one of the in-coverage periods from the communications device.

Paragraph 33. A method according to paragraph 24, wherein the determined profile of the channel conditions with respect to time within the in-coverage period in which the signals from the NTN infrastructure equipment have been detected is a configured profile of the channel conditions with respect to positions of the aerial vehicle relative to the communications device during the in-coverage period.

Paragraph 34. A method according to paragraph 24, comprising receiving a signal representing the uplink data from the communications device in advance of a commencement of one or more sub-periods of a subsequent in-coverage period during which transmission or reception of signals by the communications device can provide a relative increase in an amount of communications resources required to correctly communicate data by the transmitted or received signals compared with other sub-periods of the subsequent in-coverage period.

Paragraph 35. A method according to paragraph 34, wherein the receiving the signal representing the uplink data to the NTN infrastructure equipment in advance of the identified one or more sub-periods commencing comprises transmitting, to the communications device, signals carrying data in a Physical Downlink Shared Channel (PDSCH), and receiving the signal representing the uplink data in advance of the one or more sub-periods commencing in a Physical Uplink Control Channel (PUCCH), wherein the reception of the PUCCH interrupts the transmission of the PDSCH.

Paragraph 36. A method according to paragraph 34 or 35, wherein the signal representing the uplink data to the NTN infrastructure equipment in advance of the identified one or more sub-periods commencing includes an instruction to handover the communications device to another NTN infrastructure equipment.

Paragraph 37. A method according to any of paragraphs 24 to 36, wherein the aerial vehicle is a Low Earth Orbit (LEO) satellite.

Paragraph 38. A communications device configured to transmit or to receive via a non-terrestrial network, NTN, infrastructure equipment, the communications device comprising:

transceiver circuitry configured to transmit or to receive signals;

control circuitry configured in combination with the transceiver circuitry to detect signals from the non-terrestrial infrastructure equipment during one of a plurality of in-coverage periods during which the communications device is in a coverage area of the NTN infrastructure equipment because the communications device can receive signals transmitted either from the NTN infrastructure equipment carried by an aerial vehicle or relayed from the NTN infrastructure equipment via the aerial vehicle as the aerial vehicle passes over the communications device, based on a determined profile of channel conditions with respect to time within the in-coverage period in which the signals from the NTN infrastructure equipment have been detected either transmit signals carrying data in one or more sub-periods of a subsequent one of the in-coverage periods during which a transmission of signals by the communications device can provide a relative reduction in an amount of communications resources required to correctly communicate data carried by the transmitted signals compared with other sub-periods of the subsequent in-coverage period, or receive signals carrying data in one or more sub-periods of a subsequent one of the in-coverage periods during which a reception of signals by the communications device transmitted by the NTN infrastructure equipment can provide a relative reduction in an amount of communications resources required to correctly communicate data carried by the received signals compared with other sub-periods of the in-coverage period.

Paragraph 39. Circuitry for a communications device configured to transmit or to receive via a non-terrestrial network, NTN, infrastructure equipment, the circuitry comprising:

transceiver circuitry configured to transmit or to receive signals;

control circuitry configured in combination with the transceiver circuitry to detect signals from the non-terrestrial infrastructure equipment during one of a plurality of in-coverage periods during which the communications device is in a coverage area of the NTN infrastructure equipment because the communications device can receive signals transmitted either from the NTN infrastructure equipment carried by an aerial vehicle or relayed from the NTN infrastructure equipment via the aerial vehicle as the aerial vehicle passes over the communications device, based on a determined profile of channel conditions with respect to time within the in-coverage period in which the signals from the NTN infrastructure equipment have been detected either transmit signals carrying data in one or more sub-periods of a subsequent one of the in-coverage periods during which a transmission of signals by the communications device can provide a relative reduction in an amount of communications resources required to correctly communicate data carried by the transmitted signals compared with other sub-periods of the subsequent in-coverage period, or receive signals carrying data in one or more sub-periods of a subsequent one of the in-coverage periods during which a reception of signals by the communications device transmitted by the NTN infrastructure equipment can provide a relative reduction in an amount of communications resources required to correctly communicate data carried by the received signals compared with other sub-periods of the in-coverage period.

Paragraph 40. A non-terrestrial network, NTN, infrastructure equipment of a wireless communications network configured to transmit to or receive from one or more communications devices, the NTN infrastructure equipment comprising:

transceiver circuitry configured to transmit or to receive signals;

control circuitry configured in combination with the transceiver circuitry to receive from a communications device, a profile of channel conditions with respect to time within one of a plurality of in-coverage periods in which the signals from the NTN infrastructure equipment have been detected by the communications device during which the communications device is in a coverage area of the NTN infrastructure equipment because the communications device can receive signals transmitted either from the NTN infrastructure equipment carried by an aerial vehicle or relayed from the NTN infrastructure equipment via the aerial vehicle as the aerial vehicle passes over the communications device, based on the received profile of channel conditions with respect to time within the in-coverage period in which the signals from the NTN infrastructure equipment have been detected either transmit signals carrying data in one or more sub-periods of a subsequent one of the in-coverage periods during which a reception of signals by the communications device can provide a relative reduction in an amount of communications resources required to correctly communicate data carried by the transmitted signals compared with other sub-periods of the subsequent in-coverage period, or receive signals carrying data in one or more sub-periods of a subsequent one of the in-coverage periods during which a transmission of signals by the communications device transmitted by the NTN infrastructure equipment can provide a relative reduction in an amount of communications resources required to correctly communicate data carried by the received signals compared with other sub-periods of the in-coverage period.

Paragraph 41. Circuitry for a non-terrestrial network, NTN, infrastructure equipment of a wireless communications network configured to transmit to or receive from one or more communications devices, the circuitry comprising:

transceiver circuitry configured to transmit or to receive signals;

control circuitry configured in combination with the transceiver circuitry to receive from a communications device, a profile of channel conditions with respect to time within one of a plurality of in-coverage periods in which the signals from the NTN infrastructure equipment have been detected by the communications device during which the communications device is in a coverage area of the NTN infrastructure equipment because the communications device can receive signals transmitted either from the NTN infrastructure equipment carried by an aerial vehicle or relayed from the NTN infrastructure equipment via the aerial vehicle as the aerial vehicle passes over the communications device, based on the received profile of channel conditions with respect to time within the in-coverage period in which the signals from the NTN infrastructure equipment have been detected either transmit signals carrying data in one or more sub-periods of a subsequent one of the in-coverage periods during which a reception of signals by the communications device can provide a relative reduction in an amount of communications resources required to correctly communicate data carried by the transmitted signals compared with other sub-periods of the subsequent in-coverage period, or receive signals carrying data in one or more sub-periods of a subsequent one of the in-coverage periods during which a transmission of signals by the communications device transmitted by the NTN infrastructure equipment can provide a relative reduction in an amount of communications resources required to correctly communicate data carried by the received signals compared with other sub-periods of the in-coverage period.

Paragraph 42. A computer program comprising instructions which, when the program is executed by a computer, cause the computer to carry out a method according to paragraph 1 or paragraph 23.

It will be appreciated that in the above description, when reference is made to identification of an aerial vehicle, the aerial vehicle can be identified by any means, including the orbital trajectory of the aerial vehicle, an index into a table of aerial vehicles that is signalled by the wireless communications network and an identity of a cell that is transmitted via an aerial vehicle. When reference is made to identification of an NTN infrastructure equipment, the NTN infrastructure equipment can be identified by any means, including the identifier of an aerial vehicle carrying or comprising the NTN infrastructure equipment, the orbital trajectory of an aerial vehicle carrying or comprising the NTN infrastructure equipment, an index into a table of NTN infrastructure equipment that is signalled by the wireless communications network and an identity of a cell that is transmitted via an NTN infrastructure equipment.

Although some embodiments have been described above with reference to "satellites", it will be appreciated that such embodiments are equally applicable to other forms of aerial vehicle unless otherwise stated.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] TR 38.811, "Study on New Radio (NR) to support non terrestrial networks (Release 15)", 3rd Generation Partnership Project, December 2017.

[2] Holma H. and Toskala A, "LTE for UMTS OFDMA and SC-FDMA based radio access", John Wiley and Sons, 2009.

[3] TR 38.821, "Solutions for NR to support non-terrestrial networks (NTN) (Release 16)," 3rd Generation Partnership Project.

The invention claimed is:

1. A method of operating a communications device to transmit or to receive via a non-terrestrial network, NTN, infrastructure equipment, the method comprising:

detecting, by transceiver circuitry of the communications device, signals from the NTN infrastructure equipment during one of a plurality of in-coverage periods during which the communications device is in a coverage area of the NTN infrastructure equipment because the communications device can receive signals either transmitted from the NTN infrastructure equipment carried by an aerial vehicle, or relayed from the NTN infrastructure equipment via the aerial vehicle as the aerial vehicle passes over the communications device;

identifying, based on a determined profile of channel conditions with respect to time within the one of the plurality of in-coverage periods in which the signals from the NTN infrastructure equipment have been detected, one or more sub-periods of a subsequent in-coverage period subsequent to the one of the plurality of in-coverage periods during which a communication of data can provide a relative reduction in an amount of communications resources required to correctly communicate the data compared with other sub-periods of the subsequent in-coverage period; and transmitting signals carrying the data in the one or more sub-periods of the subsequent in-coverage period based on the identification, or receiving signals carrying the data in the one or more sub-periods of the subsequent in-coverage period based on the identification.

2. The method according to claim 1, comprising:

determining, from the detected signals, the determined profile of channel conditions with respect to time within the one of the plurality of in-coverage periods in which the signals from the NTN infrastructure equipment have been detected by the communications device, transmitting a representation of the determined profile of the channel conditions with respect to time within the one of the plurality of in-coverage periods, and receiving, from the NTN infrastructure equipment, scheduling information identifying the one or more sub-periods of the subsequent in-coverage period subsequent to the one of the plurality of in-coverage periods during which the communication of data can provide the relative reduction in the amount of communications resources required to correctly communicate the data compared with the other sub-periods of the subsequent in-coverage period.

3. The method according to claim 2, wherein the representation of the determined profile of the channel conditions with respect to time within the one of the plurality of in-coverage periods is derived from an estimation of a reference signal received power, RSRP, a measured pathloss of the detected signals, or a representation of channel state information.

4. The method according to claim 2, wherein the representation of the determined profile of the channel conditions with respect to time within the one of the plurality of in-coverage periods is determined by:

estimating a free space pathloss throughout the one of the plurality of in-coverage periods, calculating a pathloss of the detected signals between the NTN infrastructure equipment and the communications device which includes the free space pathloss and an additional pathloss, and determining the determined profile of the channel conditions with respect to time within the one of the plurality of in-coverage periods by subtracting the estimated free space pathloss from the calculated pathloss.

5. The method according to claim 2, further comprising:

determining, from the detected signals, an identifier of the aerial vehicle carrying the NTN infrastructure equipment, and transmitting the identifier to a wireless communications network via the NTN infrastructure equipment, whereby the wireless communications network can schedule transmission or reception of data using the NTN infrastructure equipment carried by the aerial vehicle and one or more other NTN infrastructure equipment carried by one or more other aerial vehicles.

6. The method according to claim 5, wherein the identifier of the aerial vehicle carrying the NTN infrastructure equipment is an identity of a cell that is transmitted via the aerial vehicle.

7. The method according to claim 1, further comprising:

determining, from the detected signals, the determined profile of channel conditions with respect to time within the one of the plurality of in-coverage periods in which the signals from the NTN infrastructure equipment have been detected by the communications device, from the determined profile of the channel conditions with respect to time within the one of the plurality of in-coverage periods, determining at least one sub-period of the subsequent in-coverage period subsequent to the one of the plurality of in-coverage periods during which the communication of data can provide the relative reduction in the amount of communications resources required to correctly communicate the data compared with the other sub-periods of the subsequent in-coverage period, transmitting an indication of the determined at least one sub-period of the subsequent in-coverage period subsequent to the one of the plurality of in-coverage periods to a wireless communications network in which the wireless communications network can schedule a transmission or reception of the data, and receiving, from the NTN infrastructure equipment, scheduling information identifying time and frequency resources from the one or more sub-periods of the subsequent in-coverage period subsequent to the one of the plurality of in-coverage periods based on the indicated at least one sub-period of the subsequent in-coverage period subsequent to the one of the plurality of in-coverage periods during which the communication of data can provide the relative reduction in the amount of communications resources required to correctly communicate the data compared with the other sub-periods of the subsequent in-coverage period.

8. The method according to claim 7, further comprising:

determining, from the detected signals, an identifier of the aerial vehicle carrying the NTN infrastructure equipment, and transmitting the identifier to the wireless communications network via the NTN infrastructure equipment, whereby the wireless communications network can schedule transmission or reception of data using the NTN infrastructure equipment carried by the aerial vehicle and one or more other NTN infrastructure equipment carried by one or more other aerial vehicles.

9. The method according to claim 7, wherein the determined profile of the channel conditions with respect to time within the one of the plurality of in-coverage periods is determined by estimating a free space pathloss throughout the one of the plurality of in-coverage periods, calculating a pathloss of the detected signals between the NTN infrastructure equipment and the communications device which includes the free space pathloss and an additional pathloss, and determining the determined profile of the channel conditions with respect to time within the one of the plurality of in-coverage periods by subtracting the estimated free space pathloss from the calculated pathloss.

10. The method according to claim 2, further comprising:

determining one or more of the sub-periods in which the communications device would prefer to transmit or to receive signals, receiving signals representing downlink data from the NTN infrastructure equipment for which an acknowledgement signal is requested, and transmitting an indication of the preferred one or more sub-periods to the NTN infrastructure equipment with the requested acknowledgement signal.

11. The method according to claim 2, wherein the transmitting the representation of the determined profile of the channel conditions with respect to time within the one of the plurality of in-coverage periods in-coverage-period-comprises;

determining that the communications device has not moved since detecting the signals from the NTN infrastructure equipment during one of the plurality of in-coverage periods, and in response, transmitting the representation of the determined profile with respect to time within the one of the plurality of in-coverage periods.

12. The method according to claim 2, further comprising:

determining whether the communications device has moved since receiving the scheduling information, and if the communications device has moved, transmitting an indication to a wireless communications network indicating that the determined profile of channel conditions with respect to time within the one of the plurality of in-coverage periods is no longer valid.

13. The method according to claim 2, wherein the transmitting the representation of the determined profile of the channel conditions with respect to time within the one of the plurality of in-coverage periods comprises;

transmitting the representation of the determined profile of the channel conditions with respect to time within the one of the plurality of in-coverage periods in a Radio Resource Control (RRC) signal, Channel State Information (CSI) signal, or as part of an initial access procedure to a base station.

14. The method according to claim 1, further comprising:

determining, from the detected signals, the determined profile of channel conditions with respect to time within the one of the plurality of in-coverage periods in which the signals from the NTN infrastructure equipment have been detected by the communications device, and based on the determined profile of channel conditions with respect to time within the one of the plurality of in-coverage periods in which the signals from the NTN infrastructure equipment have been detected, transmitting a physical random access preamble in the one or more sub-periods of the subsequent in-coverage period to the NTN infrastructure equipment.

15. The method according to claim 1, wherein the detecting, by transceiver circuitry of the communications device, the signals from the NTN infrastructure equipment comprises:

detecting signals from the NTN infrastructure equipment during the one of the plurality of in-coverage periods during which the communications device is in the coverage area of the NTN infrastructure equipment and can receive the signals from the NTN infrastructure equipment as the NTN infrastructure equipment carried by the aerial vehicle passes over the communications device, detecting signals from one or more other NTN infrastructure equipment during one of a plurality of in-coverage periods for each of the one or more other NTN infrastructure equipment during which the communications device is in a coverage area of the one or more other NTN infrastructure equipment and can receive signals from the one or more other NTN infrastructure equipment as the one or more other NTN infrastructure equipment carried by one or more other aerial vehicles pass over the communications device, and based on the determined profile of channel conditions with respect to time within the one of the plurality of in-coverage periods in which the signals from the NTN infrastructure equipment have been detected and one or more other determined profiles of channel conditions with respect to time within the one of the plurality of in-coverage periods in which the signals from the one or more other NTN infrastructure equipment have been detected, selecting to transmit or receive signals carrying the data via one of the NTN infrastructure equipment and the one or more other NTN infrastructure equipment which can provide the relative reduction in the amount of communications resources required to correctly communicate the data carried by the signals compared with others of the NTN infrastructure equipment and the one or more other NTN infrastructure equipment.

16. The method according to claim 1, further comprising:

configuring, based on the determined profile of the channel conditions with respect to time within the one of the plurality of in-coverage periods in which the signals from the NTN infrastructure equipment have been detected, a profile of the channel conditions with respect to positions of the aerial vehicle relative to the communications device during the one of the plurality of in-coverage periods, wherein the transmitting the signals carrying the data in the one or more sub-periods of the subsequent in-coverage period based on the identification comprises determining, based on the profile of the channel conditions with respect to the positions of the aerial vehicle relative to the communications device during the one of the plurality of in-coverage periods, positions of the aerial vehicle relative to the communications device during the one or more sub-periods during which a transmission of signals by the communications device can provide the relative reduction in the amount of communications resources required to correctly communicate the data carried by the transmitted signals compared with the other sub-periods of the subsequent in-coverage period; and transmitting the signals carrying data when the aerial vehicle occupies the determined positions, and the receiving the signals carrying the data in the one or more sub-periods of the subsequent in-coverage period based on the identification comprises determining, based on the profile of the channel conditions with respect to the positions of the aerial vehicle relative to the communications device during the one of the plurality of in-coverage periods, positions of the aerial vehicle relative to the communications device during the one or more sub-periods during which a reception of signals by the communications device transmitted by the NTN infrastructure equipment can provide the relative reduction in the amount of communications resources required to correctly communicate the data carried by the received signals compared with the other sub-periods of the subsequent in-coverage period; and receiving the signals carrying data when the aerial vehicle occupies the determined positions.

17. The method according to claim 1, further comprising: based on the determined profile of channel conditions with respect to time within the one of the plurality of in-coverage periods in which the signals from the NTN infrastructure equipment have been detected, identifying the one or more sub-periods of the subsequent in-coverage period subsequent to the one of the plurality of in-coverage periods during which transmission or reception of signals by the communications device can provide a relative increase in a likelihood of correctly communicating data by the transmitted or received signals compared with the other sub-periods of the subsequent in-coverage period, and configuring a Machine-Type Communication (MTC) Physical Downlink Control Channel (MPDCCH) or NB-IoT PDCCH (NPDCCH) search space formed from a set of candidates of MPDCCH/NPDCCH resources and parameters as a function of the determined profile of channel conditions with respect to time by using candidates having a lower number of repetitions in the identified one or more sub-periods compared with the other sub-periods of the subsequent in-coverage period.

18. The method according to claim 1, further comprising using fewer demodulation reference signals (DMRS) in the identified one or more sub-periods compared with the other sub-periods of the subsequent in-coverage period.

19. A communications device configured to transmit or to receive via a non-terrestrial network, NTN, infrastructure equipment, the communications device comprising:

transceiver circuitry configured to transmit or to receive signals; and control circuitry configured in combination with the transceiver circuitry to detect signals from the NTN infrastructure equipment during one of a plurality of in-coverage periods during which the communications device is in a coverage area of the NTN infrastructure equipment because the communications device can receive signals either transmitted from the NTN infrastructure equipment carried by an aerial vehicle, or relayed from the NTN infrastructure equipment via the aerial vehicle as the aerial vehicle passes over the communications device, identify, based on a determined profile of channel conditions with respect to time within the one of the plurality of in-coverage periods in which the signals from the NTN infrastructure equipment have been detected, one or more sub-periods of a subsequent in-coverage period subsequent to the one of the plurality of in-coverage periods during which a communication of data can provide a relative reduction in an amount of communications resources required to correctly communicate the data compared with other sub-periods of the subsequent in-coverage period, and transmit signals carrying the data in the one or more sub-periods of the subsequent in-coverage period based on the identification, or receive signals carrying the data in the one or more sub-periods of the subsequent in-coverage period based on the identification.

20. A non-terrestrial network, NTN, infrastructure equipment of a wireless communications network configured to transmit to or receive from one or more communications devices, the NTN infrastructure equipment comprising:

transceiver circuitry configured to transmit or to receive signals; and control circuitry configured in combination with the transceiver circuitry to receive from a communications device, a profile of channel conditions with respect to time within one of a plurality of in-coverage periods in which signals from the NTN infrastructure equipment have been detected by the communications device while the communications device is in a coverage area of the NTN infrastructure equipment because the communications device can receive signals either transmitted from the NTN infrastructure equipment carried by an aerial vehicle or relayed from the NTN infrastructure equipment via the aerial vehicle as the aerial vehicle passes over the communications device, identify, based on the received profile of channel conditions with respect to time within the one of the plurality of in-coverage periods in which the signals from the NTN infrastructure equipment have been detected, one or more sub-periods of a subsequent in-coverage period subsequent to the one of the plurality of in-coverage periods during which a communication of data can provide a relative reduction in an amount of communications resources required to correctly communicate the data compared with other sub-periods of the subsequent in-coverage period, and transmit signals carrying the data in the one or more sub-periods of the subsequent in-coverage period based on the identification, or receive signals carrying the data in the one or more sub-periods of the subsequent in-coverage period based on the identification.

* * * * *